US012664647B2

(12) United States Patent
Morard et al.

(10) Patent No.: US 12,664,647 B2
(45) Date of Patent: Jun. 23, 2026

(54) MAGNIFICATION OF MEDICAL IMAGES WITH SUPER-RESOLUTION

(71) Applicant: GE Precision Healthcare LLC, Waukesha, WI (US)

(72) Inventors: Vincent Morard, Buc (FR); Jorge Hernandez Londono, Buc (FR); Sofiene Bourghes, Buc (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 390 days.

(21) Appl. No.: 18/351,426

(22) Filed: Jul. 12, 2023

(65) Prior Publication Data

US 2025/0022124 A1     Jan. 16, 2025

(51) Int. Cl.
*G06K 9/00*          (2022.01)
*G06T 3/4053*        (2024.01)
            (Continued)

(52) U.S. Cl.
CPC .......... *G06T 7/0012* (2013.01); *G06T 3/4053* (2013.01); *G06T 5/50* (2013.01);
            (Continued)

(58) Field of Classification Search
CPC .................................. G06K 9/00; A61B 6/505
            (Continued)

(56) References Cited

U.S. PATENT DOCUMENTS 10,971,263 B2 *   4/2021   Gogin ..................... G16H 30/20
2007/0033543 A1   2/2007   Ngari et al.
            (Continued)

FOREIGN PATENT DOCUMENTS

CN          112669209 A      4/2021
CN          114255168 A      3/2022
            (Continued)

OTHER PUBLICATIONS

Dong, C. et al., "Image Super-Resolution Using Deep Convolutional Networks," ArXvic Cornell University Website, Available Online at https://arxiv.org/abs/1501.00092, Available as Early as Dec. 31, 2014, Last Revised Jul. 31, 2015, 14 pages.
Kim, J. et al., "Accurate Image Super-Resolution Using Very Deep Convolutional Networks," ArXvic Cornell University Website, Available Online at https://arxiv.org/abs/1511.04587, Available as Early as Nov. 14, 2015, Last Revised Nov. 11, 2016, 9 pages.
            (Continued)

*Primary Examiner* — Seyed H Azarian
(74) *Attorney, Agent, or Firm* — McCoy Russell LLP

(57)          ABSTRACT

The current disclosure provides methods and systems to provide a magnification capability to a software application for reviewing medical images, where a selected portion of a medical image displayed by the software application can be viewed within a magnification window at a higher resolution than other portions of the medical image. A higher-resolution medical image of the selected portion can be generated from the medical image using a trained convolutional neural network (CNN). In a first embodiment, the selected portion of the medical image is cropped and inputted into the trained CNN to generate a higher-resolution medical image corresponding to the selected portion. In a second embodiment, the medical image is inputted into the trained CNN to generate a higher-resolution medical image when the medical image is displayed, and the selected portion of the higher-resolution medical image is cropped and displayed at a time of selection.

16 Claims, 14 Drawing Sheets

(51) Int. Cl.

| | |
|---|---|
| *G06T 5/50* | (2006.01) |
| *G06T 7/00* | (2017.01) |
| *G06T 15/00* | (2011.01) |
| *G06V 10/25* | (2022.01) |

(52) U.S. Cl.

CPC .............. *G06T 15/00* (2013.01); *G06V 10/25* (2022.01); *G06T 2207/20084* (2013.01); *G06T 2207/20104* (2013.01); *G06T 2207/20132* (2013.01); *G06T 2207/20221* (2013.01)

(58) Field of Classification Search

USPC ....... 382/100, 103, 106, 128–132, 154, 156, 382/162, 168, 181, 199, 220, 224, 254, 382/286–291, 305; 378/4, 21

See application file for complete search history.

(56) References Cited

U.S. PATENT DOCUMENTS

| | | | |
|---|---|---|---|
| 2009/0226067 A1 | 9/2009 | Souza et al. | |
| 2020/0074712 A1* | 3/2020 | Wu ........................... | G06T 3/60 |
| 2020/0389672 A1 | 12/2020 | Kennett et al. | |
| 2021/0090247 A1 | 3/2021 | Jeon et al. | |
| 2021/0125707 A1* | 4/2021 | Rusko ...................... | G06T 7/11 |
| 2021/0177295 A1* | 6/2021 | Maximo ................ | A61B 5/055 |
| 2021/0228276 A1 | 7/2021 | Giraldez et al. | |
| 2022/0240899 A1 | 8/2022 | Trzasko et al. | |
| 2022/0366535 A1 | 11/2022 | Liu et al. | |
| 2022/0399101 A1 | 12/2022 | Cai et al. | |
| 2023/0153959 A1 | 5/2023 | Saharia et al. | |
| 2024/0346713 A1* | 10/2024 | Cafaro .................... | G06T 12/00 |
| 2025/0000473 A1* | 1/2025 | Bengtsson ............. | G16H 30/20 |

FOREIGN PATENT DOCUMENTS

| | | |
|---|---|---|
| CN | 114596285 A | 6/2022 |
| CN | 115281720 A | 11/2022 |
| JP | 2017113182 A | 6/2017 |
| WO | 2023014935 A1 | 2/2023 |

OTHER PUBLICATIONS

He, Z. et al., "Cascaded Deep Networks With Multiple Receptive Fields for Infrared Image Super-Resolution," IEEE Transactions on Circuits and Systems for Video Technology, vol. 29, No. 8, Aug. 10, 2018, 13 pages.

Gu, Y. et al., "MedSRGRAN: medical images super-resolution using generative adversarial networks," Multimedia Tools and Applications, vol. 79, No. 3, Aug. 2020, Available Online May 13, 2020, 26 pages.

Ho, J. et al., "Cascaded Diffusion Models for High Fidelity Image Generation," GitHub Website, Available Online at https://cascaded-diffusion.github.io/, Available as Early as Jun. 10, 2021, 28 pages.

"Deep Resolve MRI—Faster than ever before," Siemens-healthineers Website, Available Online at https://www.siemens-healthineers.com/en-us/magnetic-resonance-imaging/technologies-and-innovations/deep-resolve, Available as Early as Jul. 6, 2021, 7 pages.

Lu, Z. et al., "Transformer for Single Image Super-Resolution," ArXiv Cornell University Website, Available Online at https://arxiv.org/abs/2108.11084, Available as Early as Aug. 25, 2021, Last Revised Apr. 22, 2022, 10 pages.

"TrueFidelity—Deep Learning Image Reconstruction*," GE Healthcare Website, Available Online at https://www.gehealthcare.fr/products/computed-tomography/truefidelity, Available as Early as Dec. 1, 2021, 12 pages.

Rombach, R. et al., "High-Resolution Image Synthesis with Latent Diffusion Models," ArXiv Cornell University Website, Available Online at https://arxiv.org/abs/2112.10752, Available as Early as Dec. 20, 2021, Last Revised Apr. 13, 2022, 45 pages.

Chung, H. et al., "MR Image Denoising and Super-Resolution Using Regularized Reverse Diffusion," ArXiv Cornell University Website, Available Online at https://arxiv.org/abs/2203.12621, Available as Early as Mar. 23, 2022, 13 pages.

Du, W. et al., "Transformer and GAN Based Super-Resolution Reconstruction Network for Medical Images," ArXiv Cornell University Website, Available Online at https://arxiv.org/abs/2212.13068, Available as Early as Dec. 26, 2022, 8 pages.

Weber, T. et al., "Cascaded Latent Diffusion Models for High-Resolution Chest X-ray Synthesis," ArXiv Cornell University Website, Available Online at https://arxiv.org/abs/2303.11224, Available as Early as Mar. 20, 2023, 24 pages.

"Improving Image Quality Using Camera Raw," Adobe Website, Available Online at https://helpx.adobe.com/fr/camera-raw/using/enhance.html, Available as Early as Apr. 27, 2023, 11 pages.

ISA United States Patent and Trademark Office, International Search Report Issued in Application No. PCT/US2024/037241, Oct. 1, 2024, WIPO, 2 pages.

ISA United States Patent and Trademark Office, Written Opinion of the International Searching Authority Issued in Application No. PCT/US2024/037241, Oct. 1, 2024, WIPO, 5 pages.

* cited by examiner

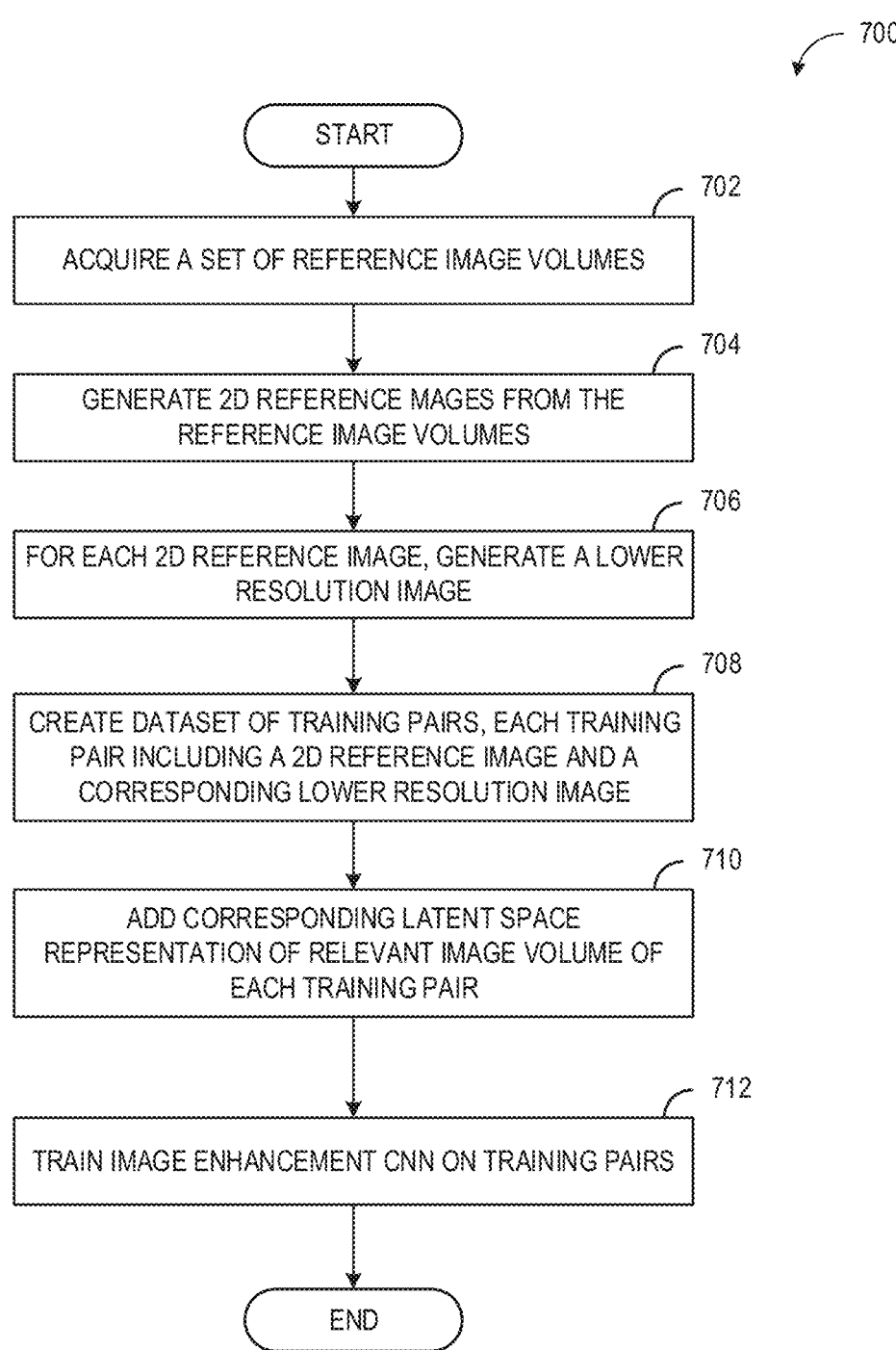

700

START

ACQUIRE A SET OF REFERENCE IMAGE VOLUMES — 702

GENERATE 2D REFERENCE MAGES FROM THE REFERENCE IMAGE VOLUMES — 704

FOR EACH 2D REFERENCE IMAGE, GENERATE A LOWER RESOLUTION IMAGE — 706

CREATE DATASET OF TRAINING PAIRS, EACH TRAINING PAIR INCLUDING A 2D REFERENCE IMAGE AND A CORRESPONDING LOWER RESOLUTION IMAGE — 708

ADD CORRESPONDING LATENT SPACE REPRESENTATION OF RELEVANT IMAGE VOLUME OF EACH TRAINING PAIR — 710

TRAIN IMAGE ENHANCEMENT CNN ON TRAINING PAIRS — 712

END

FIG. 7

MAGNIFICATION OF MEDICAL IMAGES WITH SUPER-RESOLUTION

TECHNICAL FIELD

Embodiments of the subject matter disclosed herein relate to medical imaging, and more particularly, to systems and methods for increasing a resolution of medical images.

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of x-rays through the target volume, to acquire image data and to reconstruct tomographic image volumes (e.g., three-dimensional (3-D) representations of the interior of the human body or of other imaged structures). Two-dimensional (2-D) images may be extracted from the reconstructed image volumes and viewed by a radiologist on a display device. The radiologist may spend a lot of time navigating through the 2-D images of the 3-D image volume to search for lesions, nodules, or other pathologies. In many cases, the findings may be small, including at a limit of detectability (due to the partial volume affect). When searching for the lesions, nodules, and other pathologies, the radiologist may wish to view one or more portions of a 2-D image in a higher resolution than provided in the 2-D image.

SUMMARY

The current disclosure includes a method for a medical imaging system, comprising, while displaying a two-dimensional (2-D) medical image having a first resolution on a screen of a client device of the medical imaging system, the medical image reconstructed from image data acquired via the medical imaging system, displaying a selected portion of the medical image in a second resolution, the second resolution higher than the first resolution, the selected portion selected by a user of the client device. The selected portion may be selected by a user of the medical imaging system, such as a radiologist. In various embodiments, the radiologist defines the selected portion by drawing a bounding box on the 2-D medical image, for example, using an input device such as a mouse. In a first embodiment, to generate the selected portion of the medical image in the second resolution, the 2-D medical image may be cropped based on the bounding box, and the cropped 2-D medical image may be inputted into a neural network trained to output a 2-D medical image with the same field of view but with higher resolution. The neural network may output a higher resolution cropped 2-D medical image, which may be displayed in a display panel (e.g., a magnification window) on the screen of the client device. The magnification window may be superimposed on the 2-D medical image at a location of the bounding box.

In a second embodiment, to generate the selected portion of the medical image in the second resolution, the 2-D medical image may be inputted into the neural network at a time when the 2-D medical image is first displayed on the client device, to generate a higher-resolution 2-D medical image. The higher-resolution 2-D medical image may be stored in a memory of the client device. When the user draws the bounding box on the 2-D medical image displayed on the screen of the client device, a second bounding box may be generated on the higher-resolution 2-D medical image stored in memory. The higher-resolution 2-D medical image may be cropped based on the second bounding box, to generate an image of the selected portion in the second resolution. The image may then be displayed in the magnification window on the screen of the client device. By generating the higher-resolution 2-D medical image prior to the selection of the selected portion, a responsiveness of a medical review application running on the client device may be increased. However, a latency of the medical review application running on the client device when a new 2-D medical image is displayed on the screen may also increase.

By showing the selected portion of the 2-D medical image in the second, higher resolution in the magnification window, the user may see anatomical structures within the selected portion that are not visible or clear in the 2-D medical image with the first, lower resolution. For example, an area of increased contrast uptake potentially indicative of malignant cells may be too small to see in the 2-D medical image with the first resolution, but may be visible in the 2-D medical image with the second resolution. Similarly, boundaries of larger areas of high contrast uptake may not be as clearly defined in the 2-D medical image with the first resolution, but may be clearly defined in the 2-D medical image with the second resolution. Thus, as a result of viewing the areas of increased contrast uptake in the higher-resolution 2-D medical image, an accuracy of a diagnosis of a patient of the 2-D medical images may be increased.

An additional advantage of the systems and methods described herein is that the higher-resolution 2-D medical image may be generated at the client device of the medical imaging system, where processing resources of the medical imaging system and/or an image processing system may not be consumed during generation of the higher-resolution 2-D medical image. Specifically, the 2-D medical image may be displayed on the screen of the client device by a medical review medical review software application in communication with a server of the medical imaging system and/or image processing system. The 2-D medical image is requested from the server by the client device and rendered at the server (e.g., on the backend). The 2-D medical image is sent to the client device for display, and the higher-resolution 2-D medical image is generated using computational and memory resources of the client device. In this way, an efficiency of a functioning of the medical imaging system and/or image processing system may be increased.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which:

FIG. 7 shows a flowchart illustrating an exemplary method for training a neural network to increase the resolution of a portion of a 2-D CT image, in accordance with one or more embodiments of the present disclosure;

Figure 1:
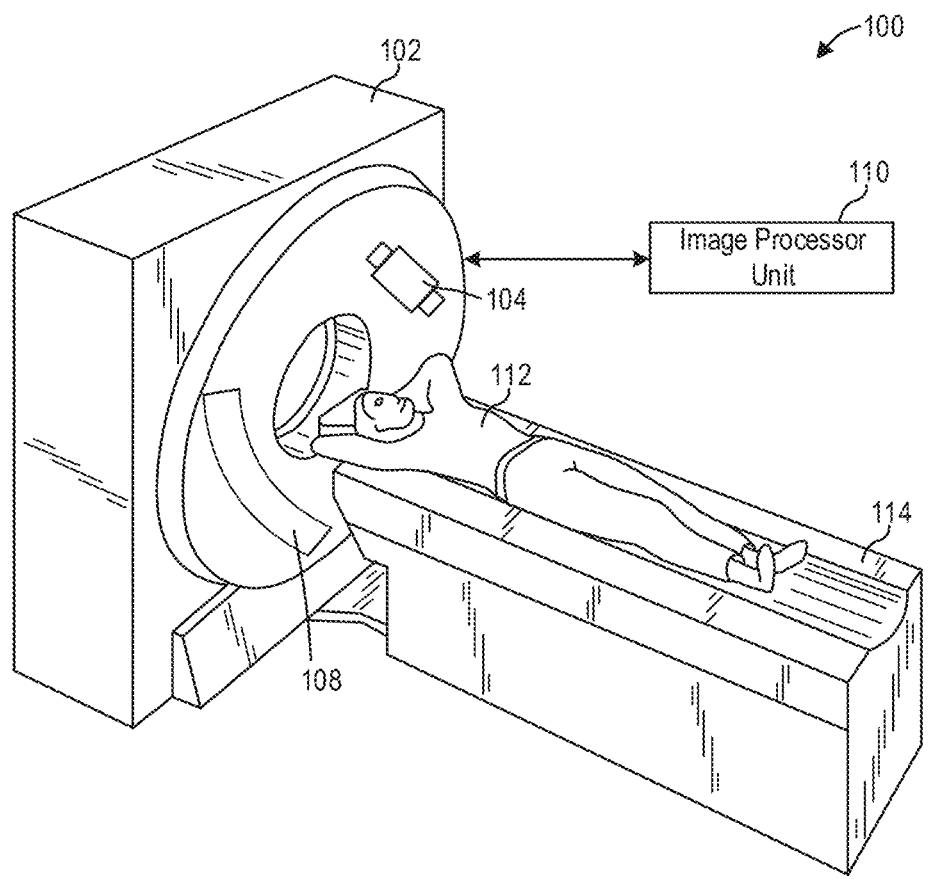
FIG. 1 shows a pictorial view of a computed tomography (CT) imaging system, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

Methods and systems are provided herein for enhancing a quality of a selected portion of a 2-D medical image, by displaying the selected portion in a higher resolution (e.g., super-resolution) than the 2-D medical image, in a display panel superimposed on the 2-D medical image (e.g., a magnification window). Unlike other medical review software applications that provide digital magnification of pixels of an image in a magnification window, the proposed system generates a higher-resolution image to display in the magnification window using a deep learning (DL) neural network.

Figure 2:
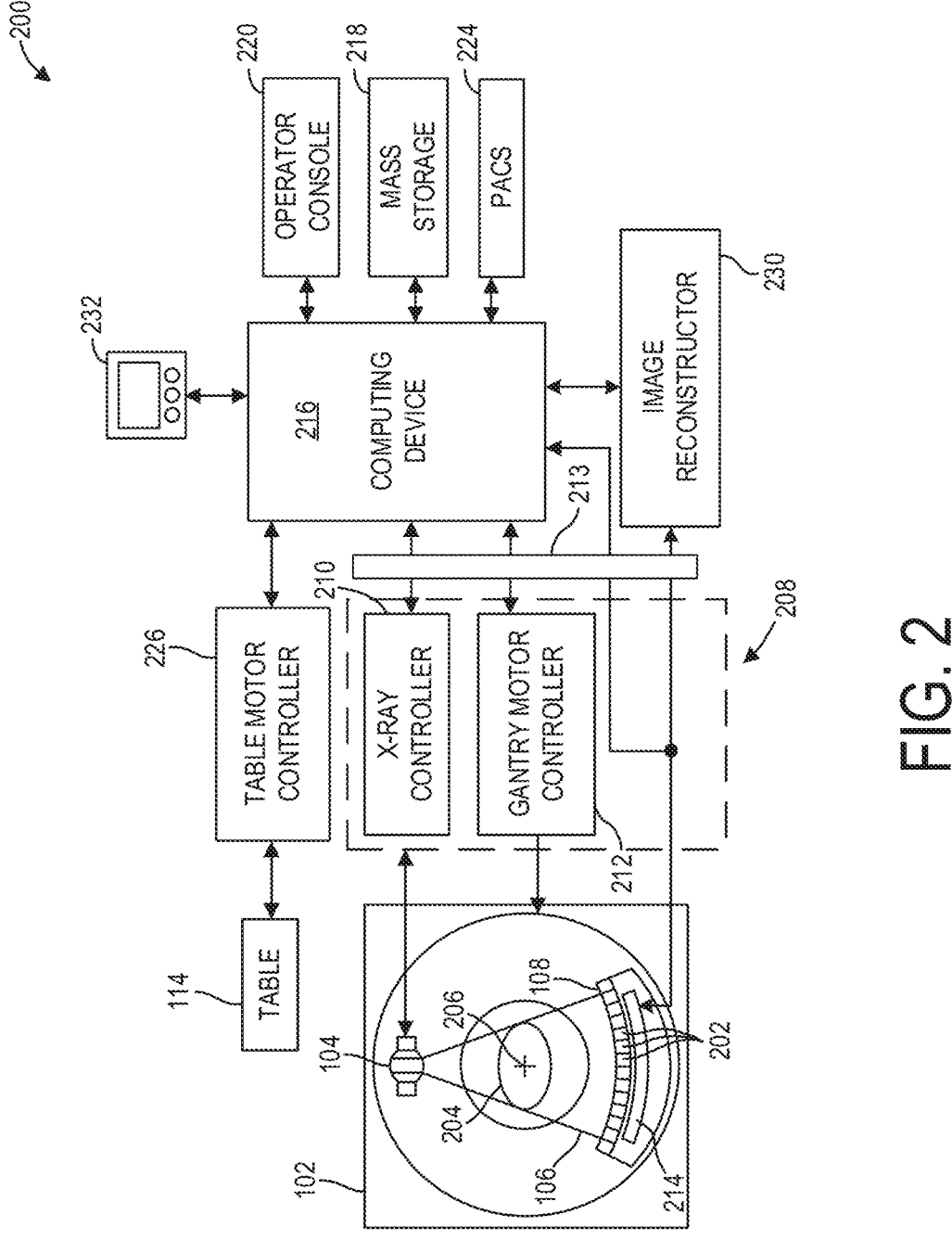
FIG. 2 shows a block schematic diagram of an example CT imaging system, in accordance with one or more embodiments of the present disclosure.
Figure 10:
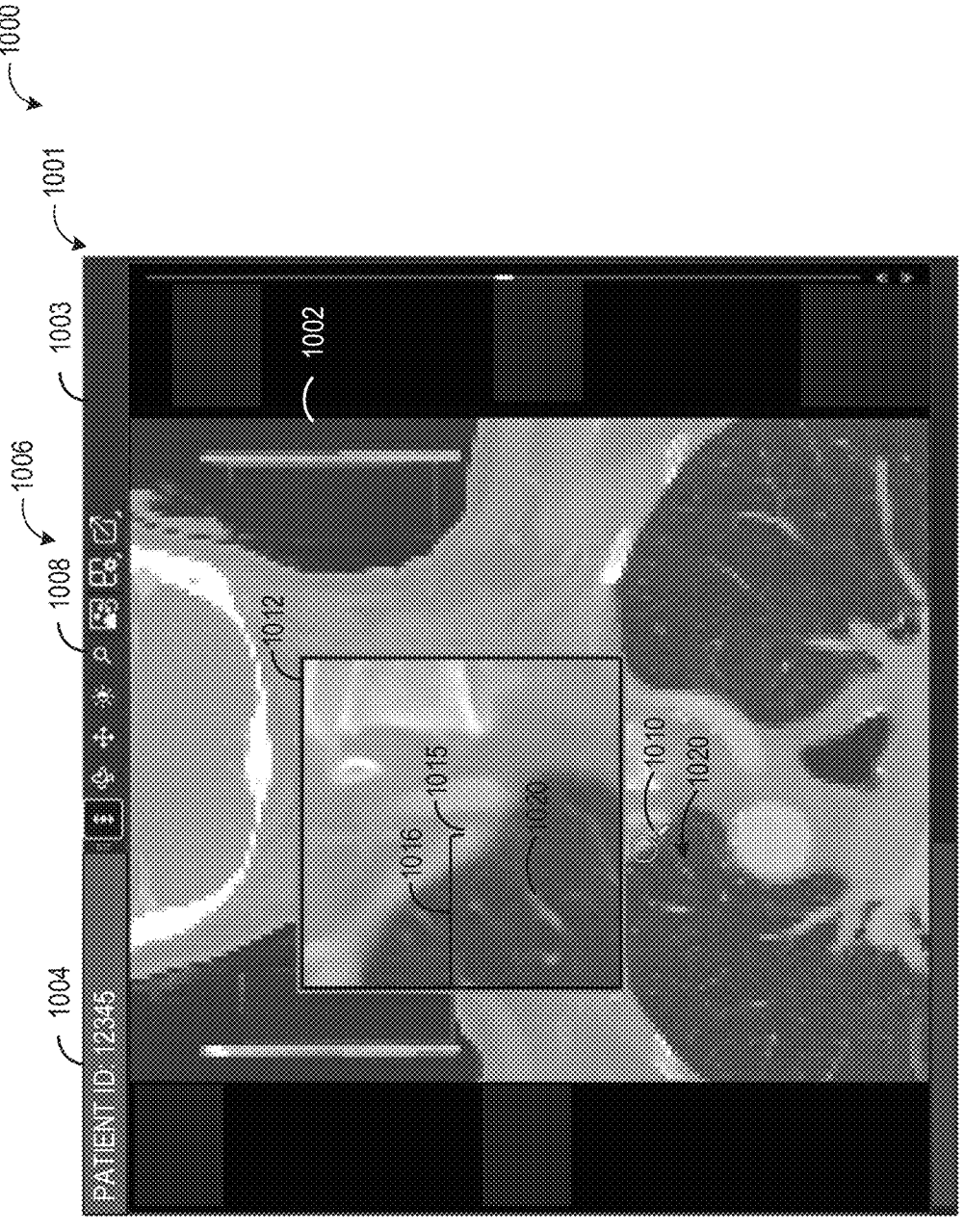
FIG. 10 shows an example of a 2-D CT image displayed on a display device, where a portion of the 2-D CT image is displayed with an increased resolution, in accordance with one or more embodiments of the present disclosure.

An example of a computed tomography (CT) imaging system is provided in FIGS. 1 and 2. An image reconstructed from projection data acquired via the CT imaging system may be processed post-reconstruction by an image processing system, such as the image processing system of FIG. 3. In one example, a radiologist may view the reconstructed image on a client device of the CT imaging system, such as the client device shown in FIG. 5. The radiologist may select a portion of the 2-D medical image, using an input device such as a mouse. For example, the radiologist may draw a bounding box around an area of interest of the 2-D medical image. In a first example of the post-reconstruction processing shown in FIG. 4A, the image processing system may crop the 2-D medical image based on the bounding box, and input the cropped 2-D medical image into an image enhancement DL model. The image enhancement DL model may output a version of the cropped 2-D medical image with a higher resolution than the original 2-D medical image. The higher resolution version of the cropped 2-D medical image may be displayed in a magnification window of the display device at a location of the bounding box, as shown in FIG. 10. In this way, the radiologist may view selected portions of the original 2-D medical image in higher resolution, generating appearance of magnification.

Figure 4A:
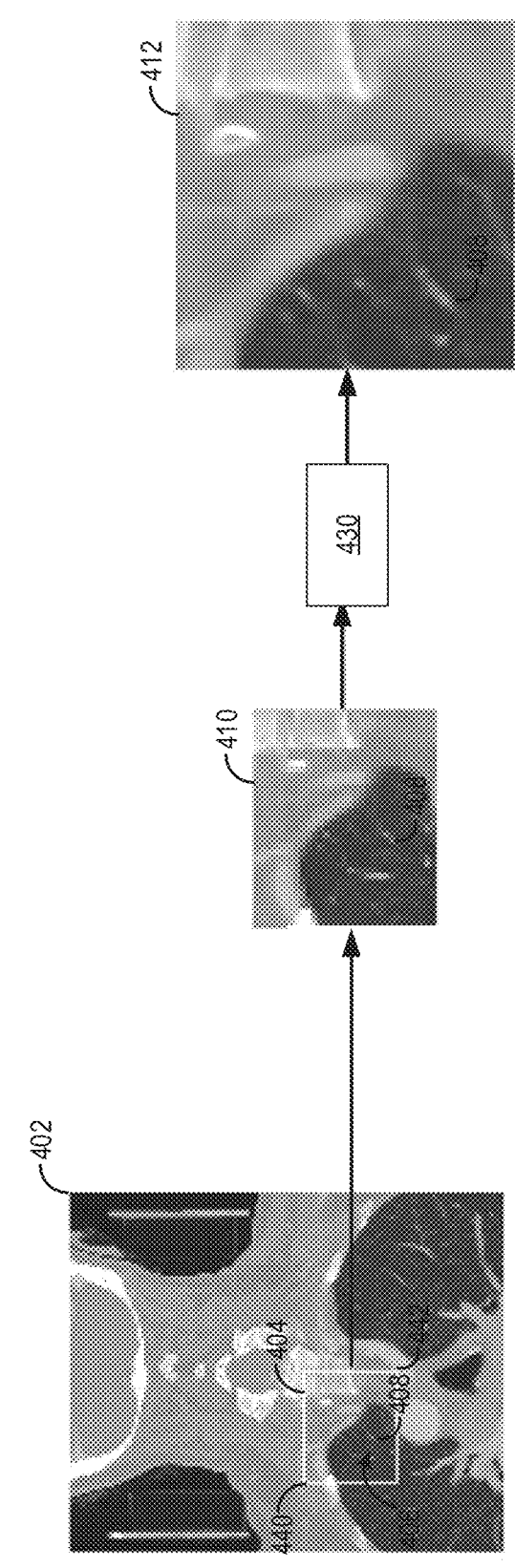
FIG. 4A shows a first workflow for increasing a resolution of a portion of a 2-D CT image, in accordance with one or more embodiments of the present disclosure.
Figure 4B:
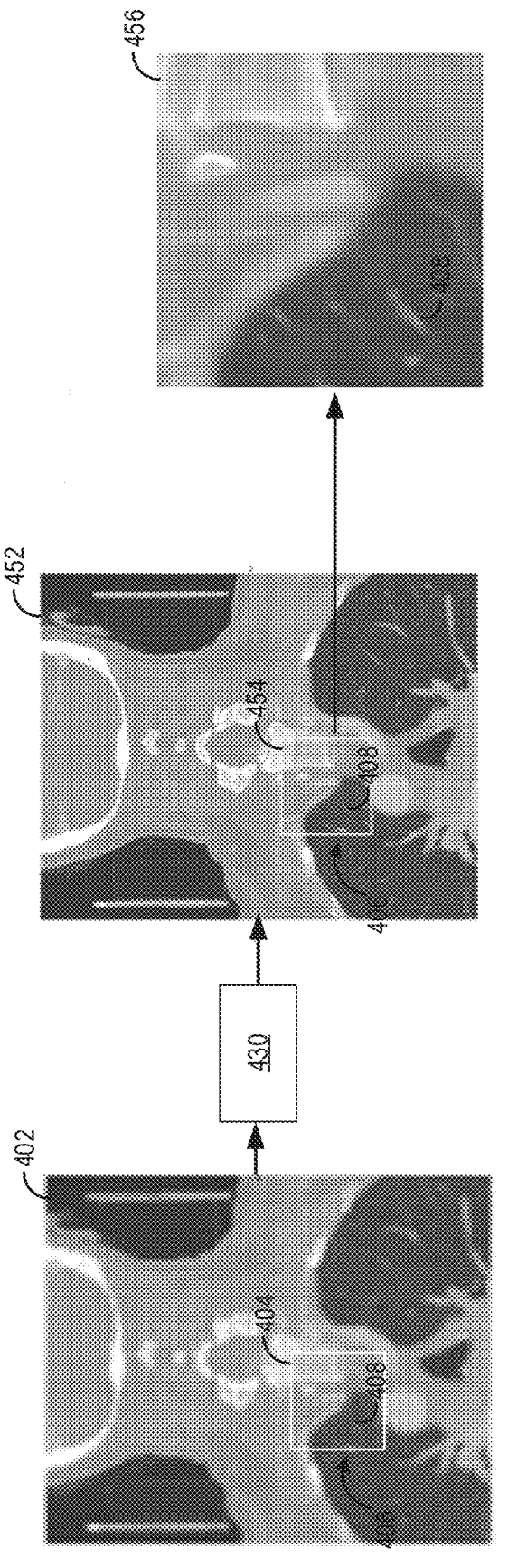
FIG. 4B shows a second workflow for increasing a resolution of a portion of a 2-D CT image, in accordance with one or more embodiments of the present disclosure.

In a second example of the post-reconstruction processing shown in FIG. 4B, the original 2-D medical image may be inputted into the image enhancement DL model to generate an enhanced 2-D medical image with a higher resolution than the original 2-D medical image. The enhanced 2-D image may be stored in a memory of the CT imaging system. When the radiologist draws the bounding box around the area of interest, the image processing system may display a corresponding area of interest of the enhanced 2-D medical image in the magnification window at the location of the bounding box.

Figure 8:
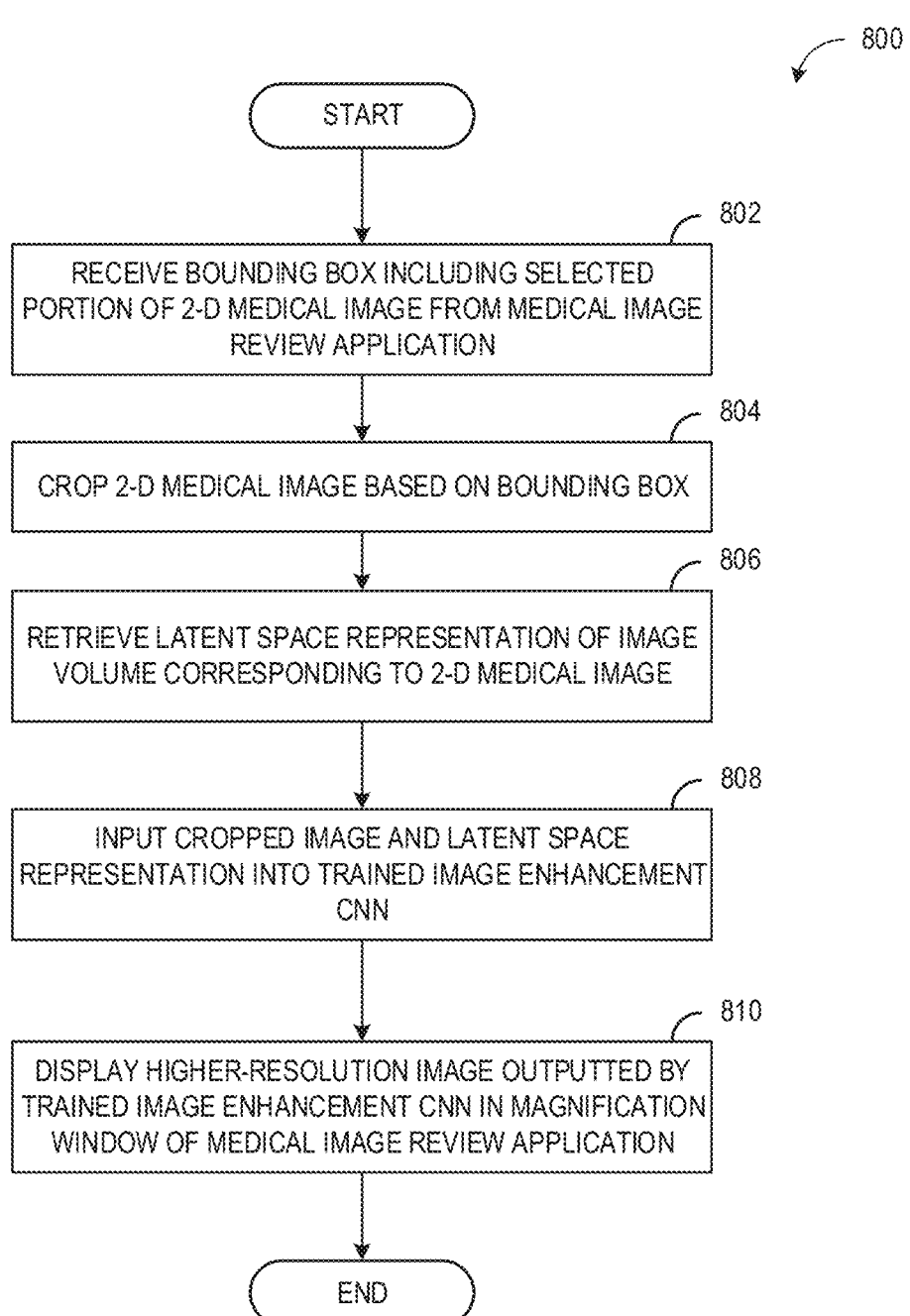
FIG. 8 shows a flowchart illustrating an exemplary method for increasing the resolution of a portion of a 2-D CT image using a neural network, in accordance with one or more embodiments of the present disclosure.
Figure 9:
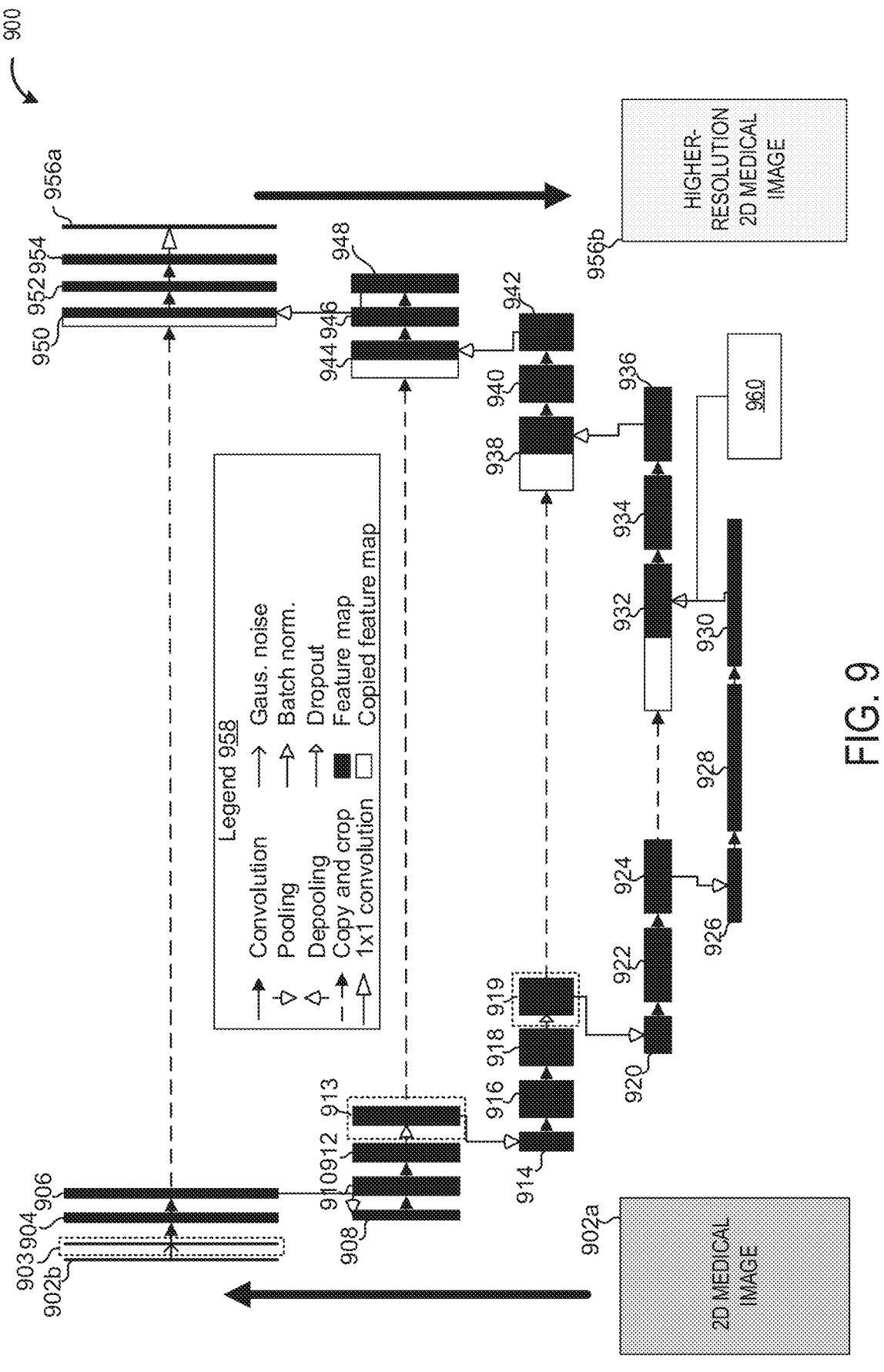
FIG. 9 shows an exemplary architecture of a neural network used to increase the resolution of a 2-D CT image, in accordance with one or more moderates of the present disclosure.
Figure 11:
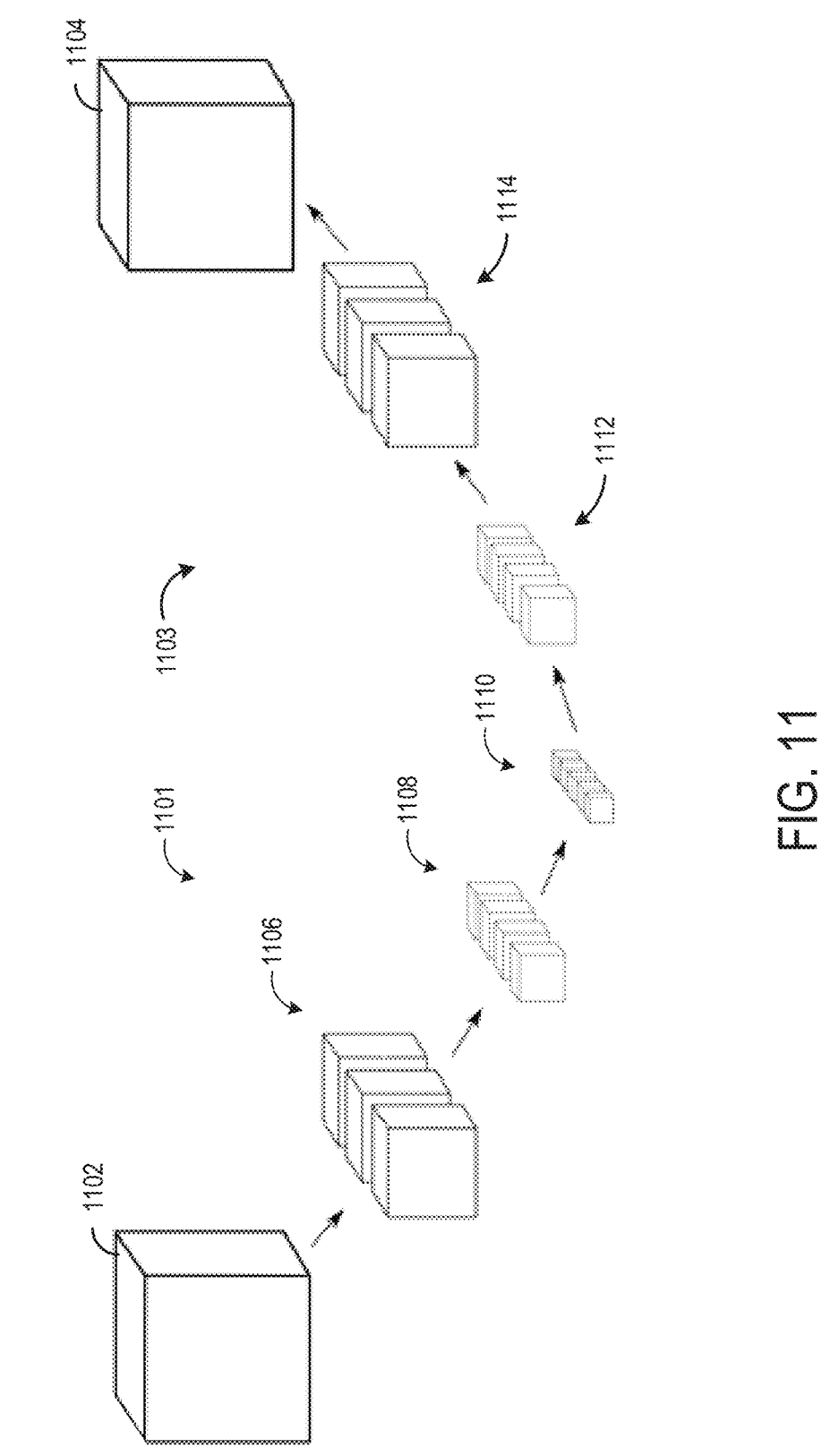
FIG. 11 shows a simplified version of an exemplary data architecture of an autoencoder CNN used to generate a latent space representation of an image volume, in accordance with one or more embodiments of the present disclosure.
Figure 12:
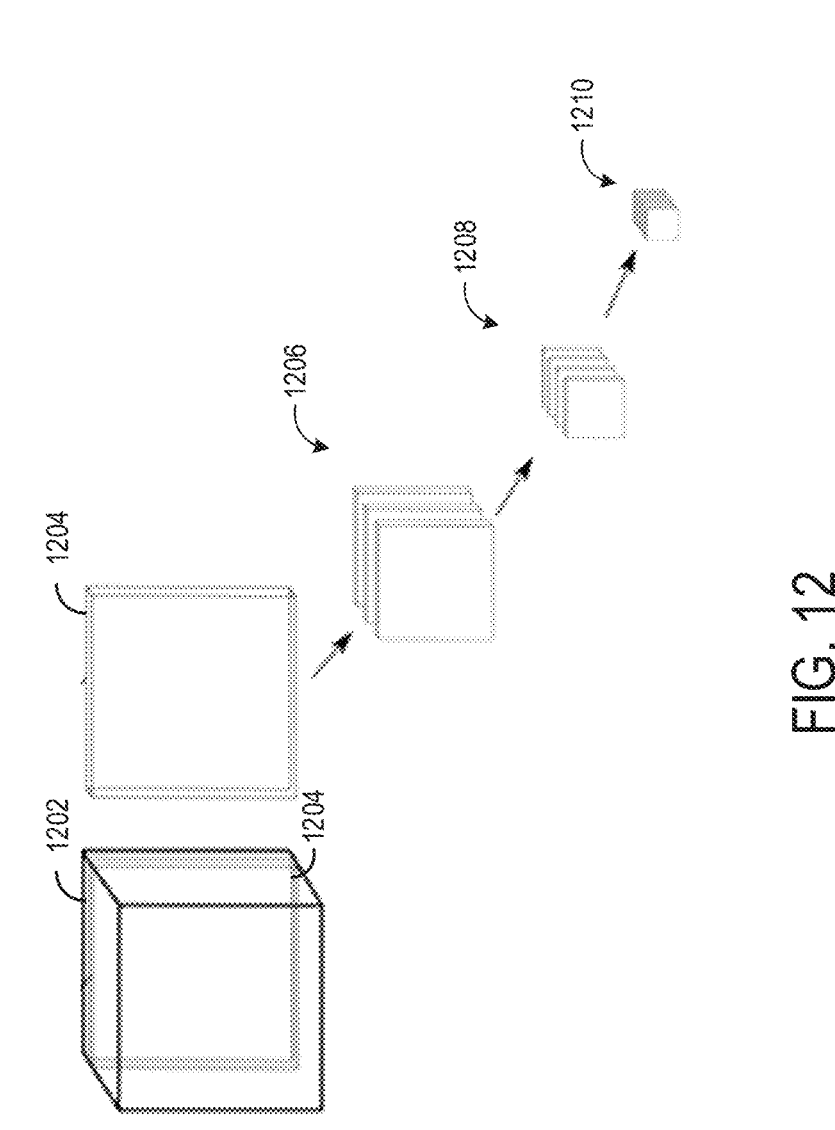
FIG. 12 shows an exemplary data architecture of an encoder that generates a latent space representation from an image volume, in accordance with one or more embodiments of the present disclosure.
Figure 13:
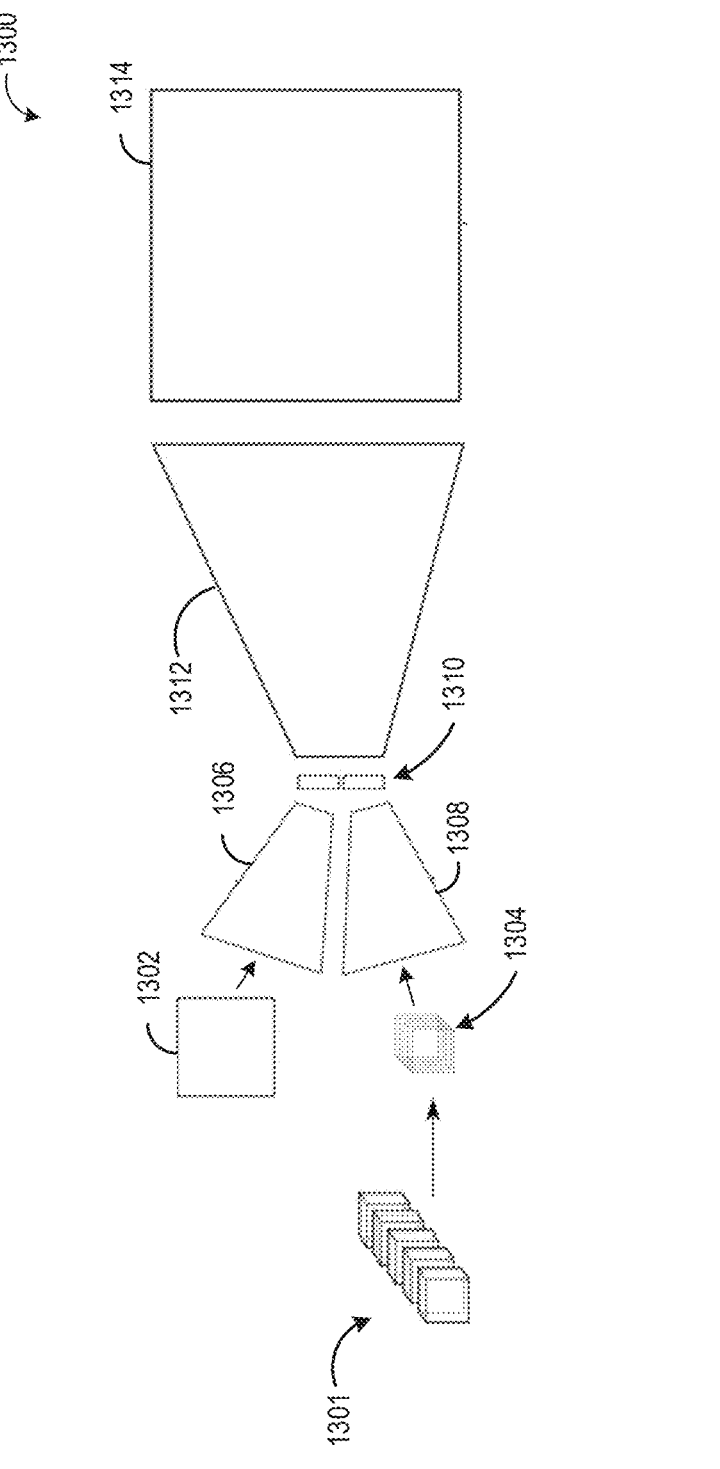
FIG. 13 shows an alternative encoder-decoder architecture of an image enhancement CNN, in accordance with one or more embodiments of the present disclosure.

In various embodiments, the image enhancement DL model may be a convolutional neural network (CNN), which may have a first encoder-decoder architecture as shown in FIG. 9, or a second, alternative encoder-decoder architecture shown in FIG. 13. When the first encoder-decoder architecture is used, a first 3-D latent space representation of the image volume generated as shown in FIG. 12 may be inputted into the CNN at a decoder portion of the CNN. When the second, alternative encoder-decoder architecture is used, a second 3-D latent space representation of the image volume generated as shown in FIGS. 11 and 13 may be inputted into the CNN at an input layer of a second encoder portion of the CNN. The CNN may be trained in accordance with the method described in reference to FIG. 7, within the neural network training system shown in FIG. 6. The CNN may be deployed to generate the higher-resolution image by following one or more steps of the method described reference to FIG. 8.

FIG. 1 illustrates an exemplary CT system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts a single x-ray source 104, in certain embodiments, multiple x-ray sources and detectors may be employed to project a plurality of x-ray radiation beams for acquiring projection data at different energy levels corresponding to the patient. In some embodiments, the x-ray source 104 may enable dual-energy gemstone spectral imaging (GSI) by rapid peak kilovoltage (kVp) switching. In some embodiments, the x-ray detector employed is a photon-counting detector which is capable of differentiating x-ray photons of different energies. In other embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), TrueFidelity™, conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of an x-ray radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the x-ray beam intersects the object constantly changes. A group of x-ray radiation attenuation measurements, e.g., projection data, from the detector array at one gantry angle is referred to as a "view." A "scan" of the object includes a set of views made at different gantry angles, or view angles, during one revolution of the x-ray source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional image of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray radiation beam 106 (see FIG. 2) that pass through the subject 204 (such as a patient) to acquire corresponding projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a 3-D volumetric image of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a client device 232 communicatively coupled to the computing device 216 and/or the image reconstructor 230 to be displayed on a display of client device 232. In some embodiments, the reconstructed images may be transmitted from the computing device 216 or the image reconstructor 230 to the storage device 218 for short-term or long-term storage.

The image reconstructor 230 may also include one or more image processing subsystems that may be used to aid in image reconstruction. For example, the one or more image processing systems may include an image processing system, such as the image processing system shown in FIG. 3, which may perform post-reconstruction processing on a 3-D image volume and/or 2-D medical images extracted from the 3-D image volume. In one embodiment, the image processing system may be configured to increase a resolution of one or more portions of a 2-D medical image displayed on a client device, such as client device 232.

It should be appreciated that while the methods and systems disclosed herein are described with reference to a CT images and a CT imaging system such as CT imaging systems 100 and 200, the methods and systems could also be applied to other types of medical images and imaging systems without departing from the scope of this disclosure. For example, the other types of medical images may include magnetic resonance images (MRI), positron emission tomography (PET) images, single photon emission tomography (SPECT) images, and/or other kinds of medical images.

Figure 3:
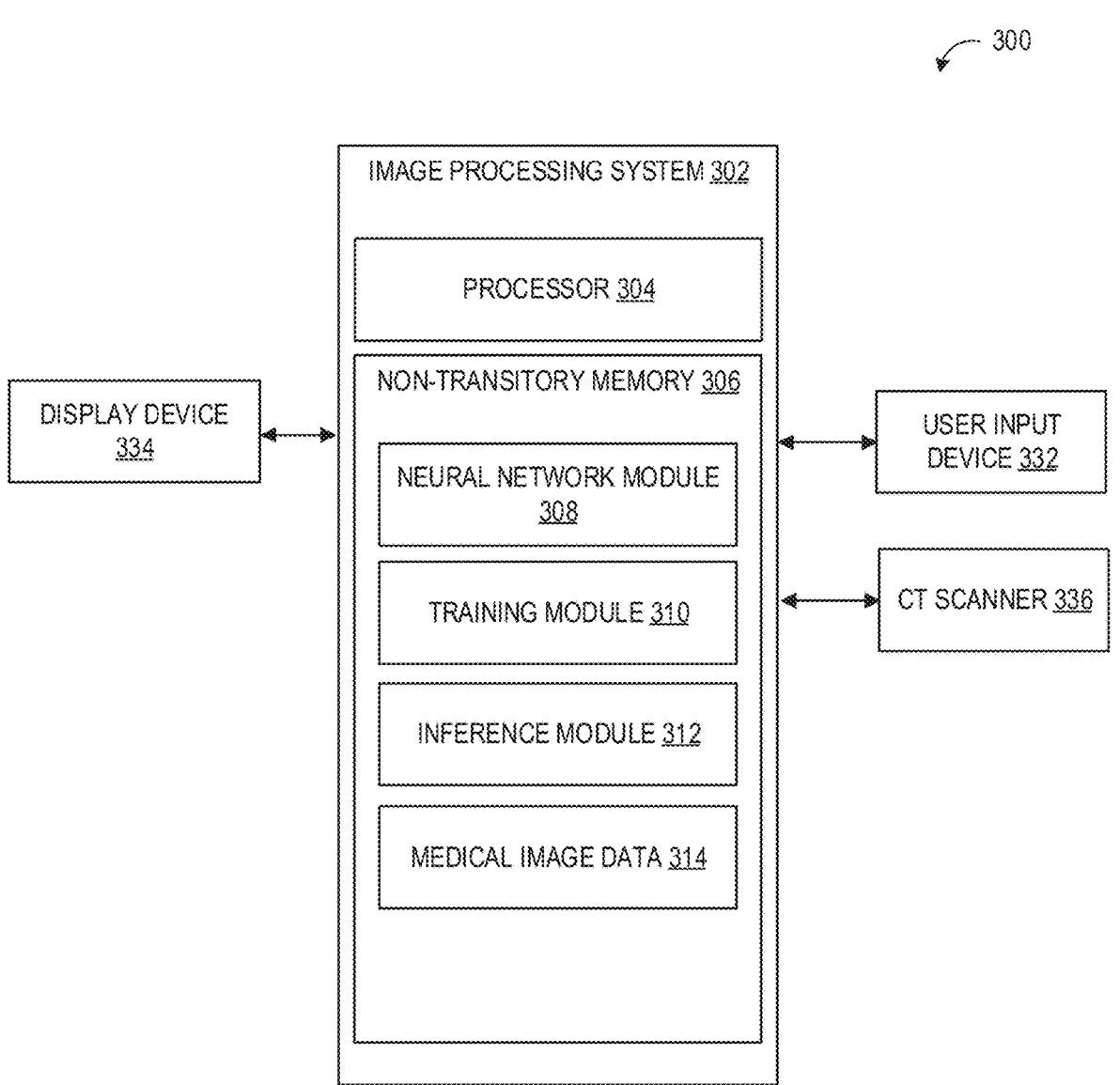
FIG. 3 shows a block diagram of an exemplary embodiment of an image processing system configured to increase a resolution of a portion of a 2-D CT image, in accordance with one or more embodiments of the present disclosure.

FIG. 3 shows an image processing system 302 of a medical imaging system 300, in accordance with an embodiment. In some embodiments, at least a portion of image processing system 302 is disposed at a device (e.g., edge device, server, etc.) communicably coupled to the medical imaging system 300 via wired and/or wireless connections. In some embodiments, at least a portion of image processing system 302 is disposed at a separate device (e.g., a workstation) which can receive images from the medical imaging system 300 or from a storage device which stores the images/data generated by the medical imaging system 300.

Image processing system 302 includes a processor 304 configured to execute machine readable instructions stored in non-transitory memory 306. Processor 304 may be single core or multi-core, and the programs executed thereon may be configured for parallel or distributed processing. In some embodiments, the processor 304 may optionally include individual components that are distributed throughout two or more devices, which may be remotely located and/or configured for coordinated processing. In some embodiments, one or more aspects of the processor 304 may be virtualized and executed by remotely-accessible networked computing devices configured in a cloud computing configuration.

Non-transitory memory 306 may store a neural network module 308, a network training module 310, an inference module 312, and medical image data 314. Neural network module 308 may include a deep learning (DL) model and instructions for implementing the DL model enhance a quality (e.g., increase a resolution) of a medical image, as described in greater detail below. Neural network module 308 may include one or more trained and/or untrained neural networks and may further include various data, or metadata pertaining to the one or more neural networks stored therein.

Training module 310 may comprise instructions for training one or more of the neural networks implementing the DL model stored in neural network module 308. In particular, training module 310 may include instructions that, when executed by the processor 304, cause image processing system 302 to conduct one or more of the steps of method 700 for training the one or more neural networks in a training stage, discussed in more detail below in reference to FIGS. 6 and 7. In some embodiments, training module 310 includes instructions for implementing one or more gradient descent algorithms, applying one or more loss functions, and/or training routines, for use in adjusting parameters of the one or more neural networks of neural network module 308. Non-transitory memory 306 also stores an inference module 312 that comprises instructions for deploying the DL model.

Non-transitory memory 306 further stores medical image data 314. Medical image data 314 may include for example, medical images acquired via a CT scanner, an MRI scanner, a scanner for spectral imaging, or via a different imaging modality.

In some embodiments, the non-transitory memory 306 may include components disposed at two or more devices, which may be remotely located and/or configured for coordinated processing. In some embodiments, one or more aspects of the non-transitory memory 306 may include remotely-accessible networked storage devices configured in a cloud computing configuration.

Image processing system 302 may be operably/communicatively coupled to a user input device 332. User input device 332 may comprise one or more of a touchscreen, a keyboard, a mouse, a trackpad, a motion sensing camera, or other device configured to enable a user to interact with and manipulate data within image processing system 302.

Image processing system 302 may also be operably/communicatively coupled to a display device 334. Display device 334 may include one or more display devices utilizing virtually any type of technology. In some embodiments, display device 334 may comprise a computer monitor, and may display medical images. Display device 334 may be combined with processor 304, non-transitory memory 306, and/or user input device 332 in a shared enclosure, or may be peripheral display devices and may comprise a monitor, touchscreen, projector, or other display device known in the art, which may enable a user to view medical images produced by a medical imaging system, and/or interact with various data stored in non-transitory memory 306.

Image processing system 302 may be operably/communicatively coupled to a CT scanner 336. CT scanner 336 may be any CT imaging device configured to image a subject such as a patient, an inanimate object, one or more manufactured parts, and/or foreign objects such as dental implants, stents, and/or contrast agents present within the body. Image processing system 302 may receive CT images from CT scanner 336, process the received CT images via processor 304 based on instructions stored in one or more modules of non-transitory memory 306, display the processed CT images on display device 334, and/or store the received CT images in medical image data 314.

It should be understood that image processing system 302 shown in FIG. 3 is for illustration, not for limitation. Another appropriate image processing system may include more, fewer, or different components.

FIGS. 4A and 4B show workflows of a radiologist using a medical review software application to view 2-D medical images generated by an imaging system, such as CT imaging systems 100 and 200, on a client device of the imaging system (e.g., client device 232 of FIG. 2). The client device may be a computing device such as a PC. An exemplary client-server architecture used by the medical review software application is described in greater detail below in reference to FIG. 5. In both workflows, the medical review software application is used to generate a magnified view of a portion of a 2-D medical image, where the magnified view includes anatomical structures of a subject of the 2-D medical image in a higher resolution than a resolution of the 2-D medical image.

Referring to FIG. 4A, a first workflow diagram 400 showing a first workflow of a radiologist is shown, where the radiologist is viewing a first CT image 402. First CT image 402 may be displayed on a screen of the client device by the radiologist. The radiologist may be interested in a specific portion 406 of an anatomy of a subject of first CT image 402 within first CT image 402. Specifically, the radiologist may be interested in one or more areas of high contrast, such as a high contrast area 408, which may be indicative of a pathology. For example, the high contrast may be a result of an increased uptake of a contrast agent due to high metabolic activity of tissues in high contrast area 408.

The radiologist may select portion 406 of the anatomy of the subject using an input device of the client device, such as a mouse, where the selected portion 406 is indicated by a bounding box 404. For example, bounding box 404 may be generated by the radiologist selecting a button of the mouse at a first location 440 of first CT image 402, corresponding to a top left corner of bounding box 404, and dragging the mouse to a second location 442 of first CT image 402, corresponding to a bottom right corner of bounding box 404. As the radiologist drag the mouse, lines of bounding box 404 may appear on the display device superimposed above first CT image 402 to indicate a location of bounding box 404. Thus, the radiologist may adjust a first position and/or first size of bounding box 404, based on a second position and/or second size of anatomical features of interest of selected portion 406.

When the radiologist releases the button of the mouse, a second CT image 410 may be generated at the client device, where second CT image 410 is a cropped version of first CT image 402 including anatomical features within bounding box 404 and not including anatomical features outside of bounding box 404. Second CT image 410 includes high contrast area 408. In FIG. 4A, a first size of second CT image 410 is shown as greater than a second size of bounding box 404, where individual pixels of second CT image 410 may be seen more clearly than in first CT image 402. However, a resolution of second CT image 410 is equal to a resolution of first CT image 402. Thus, second CT image 410 may represent a digital magnification of the anatomical features within bounding box 404. As a result of the digital magnification, high contrast area 408 may be more easily visible in second CT image 410 than in first CT image 402. However, a pixelation of high contrast area 408 in second CT image 410 may make boundaries and/or other specific features of high contrast area 408 more difficult to see in second CT image 410 than in first CT image 402.

To make the boundaries and/or other specific features of high contrast area 408 easier to see, second CT image 410 may be inputted into a trained image enhancement DL model 430. DL model 430 may be included in the medical review software application, or DL model 430 may be stored on the client device and accessed by the medical review software application. Image enhancement DL model 430 may be trained to increase a resolution of second CT image 410, as described below in reference to FIGS. 6 and 7, within an image processing system such as image processing system 302 of FIG. 3.

Image enhancement DL model 430 may output a third CT image 412, which may be an enhanced, higher resolution version of second CT image 410. Third CT image 412 includes high contrast area 408. However, in contrast with second CT image 410, third CT image 412 shows the selected portion 406 of the anatomical structures of the subject, including high contrast area 408, in a higher resolution than in second CT image 410 and first CT image 402. As a result of showing high contrast area 408 in the higher resolution, the boundaries and/or other specific features of high contrast area 408 may be easier for the radiologist to see on the screen of the client device.

FIG. 4B shows a second workflow diagram 450 of a second, alternative workflow, where in the second workflow, the radiologist is viewing first CT image 402 on the client device as described above in reference to FIG. 4A. As in the first workflow of FIG. 4A, the radiologist is specifically interested in the areas of high contrast, such as high contrast area 408 of portion 406 of the anatomical structures of the subject.

In the second workflow, when the radiologist first displays first CT image 402 on the client device, the image processing system automatically inputs first CT image 402 into image enhancement DL model 430. Image enhancement DL model 430 outputs a second CT image 452, where second CT image 452 is a higher resolution version of first CT image 402. Second CT image 452 may be stored in a memory of the client device. In the second workflow, the radiologist may generate bounding box 404 on first CT image 402 with the mouse, as in the first workflow. When the radiologist generates bounding box 404 on first CT image 402, the medical review software application may generate a second, corresponding bounding box 454 on second CT image 452. Second CT image 452 may be cropped based on second, corresponding bounding box 454 to form a third CT image 456, where third CT image 456 includes high contrast area 408. As a result of third CT image 456 being cropped from the higher-resolution second CT image 452, third CT image 456 shows portions of anatomical structures within bounding box 404 in higher resolution than in first CT image 402. In particular, high contrast area 408 is displayed in a higher resolution in third CT image 456 that in first CT image 402.

A benefit of the second workflow over the first workflow is that the calculations performed during generation of the higher resolution image may be performed once per slice of a corresponding 3-D image volume, allowing for more frames per second to be generated when moving the mouse. However, a disadvantage of the second workflow is that a latency of the medical review software application on the client device may be higher than the first workflow when changing a camera position (e.g., when selecting a new slice of the corresponding 3-D image volume). Additionally, a first amount of memory of the client device consumed in performing the calculations for generating and for storing the (larger) higher resolution image of the second workflow may be greater than a second amount of memory consumed in performing the calculations for generating and for storing the (smaller) high-resolution image of the first workflow, which corresponds to the bounding box rather than the entire 2-D image. Thus, a trade-off may exist between latency of the medical review software application between camera positions versus a responsiveness of the medical review software application while manipulating the mouse.

Figure 5:
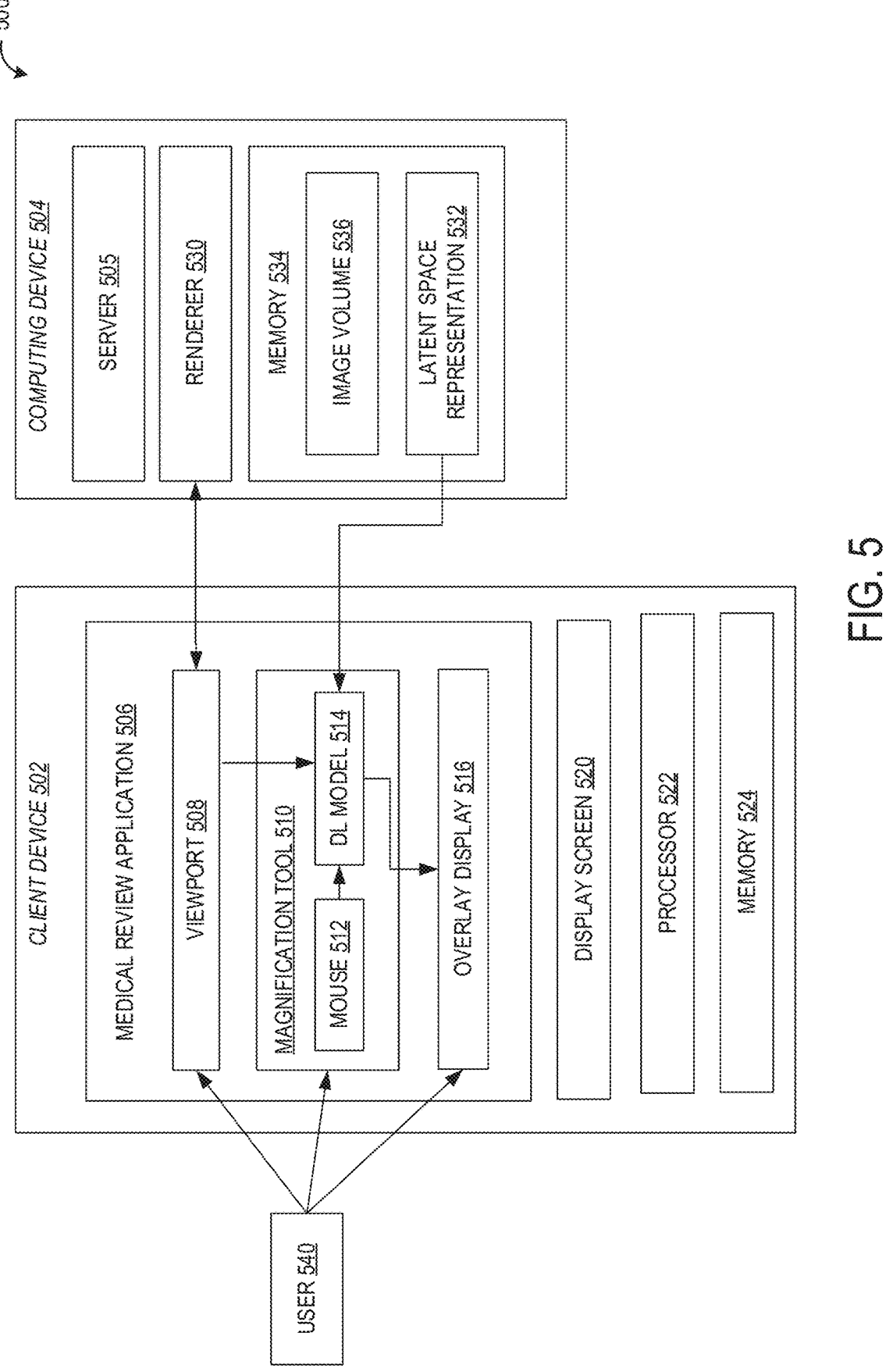
FIG. 5 shows a block diagram of a client-server architecture used to display a 2-D medical image on a display screen of a client device, in accordance with one or more embodiments of the present disclosure.

FIG. 5 shows an exemplary client-server architecture 500 used by a medical review application 506 running on a client device 502, where client device 502 is in communication with a server 505 hosted on a computing device 504. Client device 502 may be a computer, such as a PC or a tablet. In various embodiments, computing device 504 may be a non-limiting example of computing device 216 of imaging system 200 of FIG. 2, and client device 502 may be a non-limiting example of client device 232 of imaging system 200.

User 540 may interact with client device 502 via medical review application 506. For example, user 540 may be a radiologist viewing medical images (e.g., CT images, MRI images, PET images, etc.) on a display screen 520 of client device 502. The medical images may be reconstructed by an image reconstructor of an imaging system (e.g. image reconstructor 230 of imaging system 200). Client device 502 further includes a processor 522, and a non-transitory memory 524. Processor 522 may be configured to execute machine readable instructions stored in non-transitory memory 524. Processor 522 may be single core or multi-core, and the programs executed thereon may be configured for parallel or distributed processing.

To review the medical images on display screen 520, user 540 may select a relevant image volume 536 via a menu of medical review application 506. When image volume 536 is selected, 2-D medical images representing slices of image volume 536 may be generated in a viewport 508 of medical review application 506, based on a selected or default point of view/camera angle. Viewport 508 may be displayed on display screen 520. User 540 may navigate through image volume 536 using controls of viewport 508, where in response to user 540 adjusting one or more of the controls, different 2-D medical images corresponding to different slices of image volume 536 may be displayed in viewport 508. The different 2-D medical images may include different views of image volume 536, such as a sagittal view, a coronal view, and/or an axial view, which may be concurrently displayed in viewport 508.

Image volume 536 may be stored in a memory 534 of computing device 504. As the user navigates through image volume 536, 2-D medical images corresponding to a desired camera angle of image volume 536 may be requested from server 505. In response to receiving a request for a 2-D medical image from medical review application 506, server 505 may generate the corresponding 2-D medical image using a renderer 530. When the 2-D medical image has been rendered by renderer 530, the 2-D medical image may be transmitted to medical review application 506. The 2-D medical image may then be displayed in viewport 508. In this way, the processing of image volume 536 carried out by renderer 530 is performed using computational resources of computing device 504 and memory 534, and processor 522 and memory 524 of client device 502 are not used to process image volume 536. As a result, the usage of computational resources of client device 502 by medical review application 506 may be minimized, which may decrease a latency of the display of medical images and/or increase a responsiveness of medical review application 506.

When the user reviews a 2-D medical image displayed in viewport 508, the user may wish to see a portion of the 2-D medical image in greater detail. For example, user may be reviewing a specific region of the 2-D medical image, and/or looking for indications of diseased tissues that may be small and/or difficult to see. To allow the user to view the portion of the 2-D medical image in greater detail, medical review application 506 includes a magnification tool 510. For example, magnification tool 510 may be accessible by the user via control element of viewport 508, such as a magnifying glass icon.

To use magnification tool 510, user may select the portion of interest of the 2-D medical image using a user input device such as a mouse 512 coupled to client device 502. For example, user may select a button of mouse 512 and drag mouse 512 to draw a bounding box around the portion of interest of the 2-D medical image. In other embodiments, a different user input device may be used.

When the bounding box around the portion of interest of the 2-D medical image has been drawn (e.g., when the user unselects the button of mouse 512), magnification tool 510 may generate a second, cropped 2-D medical image corresponding to the portion of the 2-D medical image within the bounding box. The second, cropped 2-D medical image may be inputted into a trained DL model 514, where DL model 514 is trained to generate a higher-resolution version of the 2-D medical image. In various embodiments, DL model 514 may be a neural network, such as a CNN, a diffusion CNN, or a generative adversarial network (GAN). An exemplary image enhancement CNN is described below in reference to FIG. 6.

DL model 514 may take the second, cropped 2-D medical image as input and output a higher resolution version of the second, cropped 2-D medical image. The high-resolution version of the second, cropped 2-D medical image may be displayed to user 540 in an overlay display 516, where overlay display 516 is superimposed on the 2-D medical image at a location of the bounding box. For example, overlay display 516 may include a display panel or window showing the high-resolution version of the second, cropped 2-D medical image (e.g., a magnification window). An example magnification window is shown in FIG. 10.

To increase a quality of the high-resolution version of the second, cropped 2-D medical image, a 3-D latent space representation 532 of image volume 536 may additionally be inputted into DL model 514 as a second input, along with the second, cropped 2-D medical image. Before medical review application 506 is opened, a convolutional neural network (CNN) implemented with an autoencoder architecture may be trained to generate a compressed version of image volume 536, referred to as latent space of image volume 536. To generate the latent space, image data of image volume 536 may be inputted into an input layer of a first, encoder portion of the autoencoder CNN. The image data may be propagated through a first series of convolutional (and pooling) layers of the first, encoder portion to generate the compressed representation of image volume 536. The compressed representation may then be propagated through a second series of convolutional (and upscaling) layers of the second, decoder portion of the autoencoder to reconstruct image volume 536. A loss representing a difference between the reconstructed image volume outputted by the autoencoder CNN and image volume 536 may be back propagated through the decoder and encoder portions of the autoencoder CNN to update weights and biases at each layer of the autoencoder CNN. When the loss decreases below a threshold loss, training is stopped, and the compressed representation of image volume 536 forms the latent space. Latent space representation 532 may be generated from the latent space. For example, latent space representation 532 may be a portion of the latent space. Latent space representation 532 may include 3-D feature information extracted from image volume 536 by the first series of convolutional layers of the encoder portion.

Referring briefly to FIG. 11, a simplified version of an exemplary data architecture of an autoencoder CNN 1100 is shown. Autoencoder CNN 1100 has an encoder portion 1101 and a decoder portion 1103. Autoencoder CNN 1100 may be trained to take an image volume 1102 as input, and output a reconstructed image volume 1104, where reconstructed image volume 1104 includes substantially equivalent image data as image volume 1102. Additionally, reconstructed image volume 1104 may have less noise than image volume 1102, and may be a higher quality image.

During each iteration of training, image data of image volume 1102 is inputted into one or more convolutional layers of encoder portion 1101, such as convolutional layers 1106 and 1108. At each convolutional layer, compressed (lower dimensionality) versions of the image data are generated for a plurality of channels, where each channel represents a feature map of the input. After each pooling, the number of feature maps may increase, to capture additional information. After the image data is propagated through the convolutional layers, a compressed representation 1110 of image volume 1102 is generated for the plurality of channels. Compressed representation 1110 may be referred to as the latent space of image volume 1102.

Compressed representation 1110 may then be propagated through a plurality of convolutional layers of decoder portion 1103, such as convolutional layers 1112 and 1114. At each of the convolutional layers of decoder portion 1103, image data of compressed representation 1110 may be expanded (higher dimensionality), until reconstructed image volume 1104 is outputted. Image data of reconstructed image volume 1104 may have a one-to-one correspondence with image data of image volume 1102. A difference between reconstructed image volume 1104 and image volume 1102 may then be back propagated through the convolutional layers of decoder portion 1103, compressed representation 1110, and encoder portion 1101, to update weights and biases of the convolutional layers.

When the training procedure has converged, training of autoencoder CNN 1100 may be stopped. Once autoencoder CNN 1100 has been trained, compressed representation 1110 may represent an accurate latent space of image volume 1102, where the latent space includes sufficient 3-D feature information of image volume 1102 to re-create image volume 1102. After autoencoder CNN 1100 has been trained, during an inference stage, a new image volume may be encoded using encoding portion 1101 to generate latent space for the new input image volume. The inference stage is described in greater detail below in reference to FIG. 8.

Returning to FIG. 5, when medical review application 506 is opened, client device 502 may request latent space representation 532 from server 505. The received latent space representation 532 may be stored in memory 524. The 3-D feature information included in latent space representation 532 may be used by DL model 514 (e.g. the image enhancement CNN) to generate the higher-resolution version of the cropped 2-D medical image. By including the 3-D feature information stored in latent space representation 532 when generating the high-resolution version, the quality of the higher-resolution version may be increased, where a first higher-resolution version of the cropped 2-D medical image generated using the 3-D feature information may be of higher quality than a second higher-resolution version of the cropped 2-D medical image generated without using the 3-D feature information. The use of a latent space representation of an image volume as an input into the image enhancement CNN is described in greater detail below, in reference to FIG. 6.

After the high-resolution version of the second, cropped 2-D medical image is displayed in overlay display 516, user 540 may review anatomical structures of the 2-D medical image appearing in overlay display 516 in greater detail than in the 2-D medical image displayed in viewport 508. User 540 may also view different portions of the anatomical structures of the 2-D medical image by closing overlay display 516, and re-drawing the bounding box. For example, in one embodiment, user 540 may close overlay display 516 by selecting an icon (e.g., such as an X in a top corner of overlay display 516) displayed in overlay display 516. User 540 may reselect magnification tool 510, for example, by selecting the magnifying glass icon in medical review application 506. When the magnifying glass icon is selected, a cursor displayed in viewport 508 a change to a magnifying glass icon. User 540 may draw a new bounding box with mouse 512, to generate a new cropped 2-D medical image, and a new high-resolution 2-D medical image may be generated by DL model 514 and displayed in overlay display 516. In this way, various portions of an initial 2-D medical image may be displayed in a higher resolution within a magnification window in real time, based on bounding boxes drawn by user 540.

Alternatively, in some embodiments, the selected portion of the 2-D medical image may not be selected based on a bounding box drawn by user 540, and the selected portion may be selected based on a field of view (FOV) setting in a position of mouse 512. In such embodiments, user 540 may click on a desired location within the 2-D medical image using mouse 512, and the bounding box may be automatically drawn around the desired location based on the FOV (e.g., with the desired location at a center of the FOV). The FOV may be adjusted by user 540 via one or more controls of magnification tool 510.

As an example, user 540 may identify a small area of the 2-D medical image with high contrast, which may be indicative of a high contrast agent uptake rate due to high metabolic activity. User 540 may not be able to see the small area clearly in the 2-D medical image, where boundaries and/or other features of the small area may be blurry or too small to visualize. User 540 may wish to view the small area at a higher resolution. User 540 may select the location on the 2-D medical image with mouse 512 (or a different user input device). When user 540 selects the location, the bounding box may be automatically drawn around the location, based on a currently defined FOV of magnification tool 510. User 540 may adjust the FOV using one or more controls of magnification tool 510, for example, to make the bounding box larger or smaller. When the bounding box is generated, the high-resolution 2-D medical image corresponding to the cropped 2-D medical image is displayed in overlay display 516, as described above. User 540 may view the small area in the higher-resolution 2-D medical image, where user 540 may view the boundaries and/or other features of the small area that were not visible in the 2-D medical image. As a result of viewing the boundaries and/or other features of the small area, user 540 may make a more accurate diagnosis of a subject of the 2-D medical image than if the higher-resolution 2-D medical image were not generated.

As described above in reference to FIG. 4B, in some embodiments, the 2-D medical image may be inputted into DL model 514 (e.g., the image enhancement CNN) before user 540 generates the bounding box, to generate a higher-resolution 2-D medical image corresponding to the 2-D medical image. For example, the 2-D medical image may be inputted into DL model 514 when the 2-D medical image is received from server 505 and displayed in viewport 508. In such embodiments, when user 540 generates the bounding box, a corresponding area of higher resolution 2-D medical image may be cropped and displayed in overlay display 516.

FIG. 10 shows a magnification window 1001 of a display panel of a medical review application 1000, which may be a non-limiting example of medical review application 506 of FIG. 5. Medical review application 1000 may be opened on a client device of a medical imaging system (e.g., client device 502) used by radiologist to view medical images of the patient. The client device may communicate with a computing device of the medical imaging system (e.g., computing device 504). Specifically, 2-D medical images may be requested from the computing device by the client device, and the computing device may generate the 2-D medical images from an image volume stored on the computing device and send to the 2-D medical images to the client device to be displayed to the radiologist.

In FIG. 10, medical review application 1000 displays a 2-D medical image 1002 of a patient in window 1001. Window 1001 includes a top border area 1003, which may include information such as a patient identifier 1004 and/or other textual information. Top border area 1003 may also include various control elements (e.g., icons) 1006. The user of medical review application 1000 may select one or more of the various control elements 1006 to perform one or more actions in window 1001.

In particular, control elements 1006 include a magnifying glass icon 1008, which when selected by the user, may generate a magnification window 1012. Magnification window 1012 may be superimposed on 2-D medical image 1002. As described above, when the user selects magnifying glass icon 1008, and appearance of a cursor 1010 displayed in window 1001 a change to a magnifying glass icon. When the cursor is displayed as a magnifying glass icon, the user may position the magnifying glass icon at a desired location in 2-D medical image 1002, and select a desired portion of an anatomy of the patient displayed in 2-D medical image 1002 to be shown in greater detail in magnification window 1012.

In the depicted embodiment, the user has positioned the magnifying glass cursor at the desired location and selected a button or other control element of a user input device such as a mouse. For example, user may be interested in specifically reviewing an area of high contrast 1020 in 2-D medical image 1002. In 2-D medical image 1002, a size of the area of high contrast 1020 is small and the area of high contrast 1020 is pixelated, where details of the area of high contrast 1020 are not clearly visible. As a result of selecting the button at the desired location, magnification window 1012 displays an area around the desired location in a higher resolution than the resolution of 2-D medical image 1002. For example, the desired location indicated by magnifying glass cursor 1010 in 2-D medical image 1002 may correspond to a center point 1015 of magnification window 1012. The area around the desired location may be defined by a distance 1016 between center point 1015 and an edge of magnification window 1012 (e.g., a left edge, a right edge, a top edge, and/or a bottom edge). In the depicted embodiment, magnification window 1012 has a square shape. In other embodiments, magnification window 1012 may have a circular shape, or a different shape.

In magnification window 1012, the area of high contrast 1020 is shown in higher resolution, where an extent, a shape, and a boundary of area of high contrast 1020 is more clearly defined than in 2-D medical image 1002. As a result of the area of high contrast 1020 being shown in the higher resolution, the radiologist may or accurately and efficiently diagnose the condition of the patient.

Figure 6:
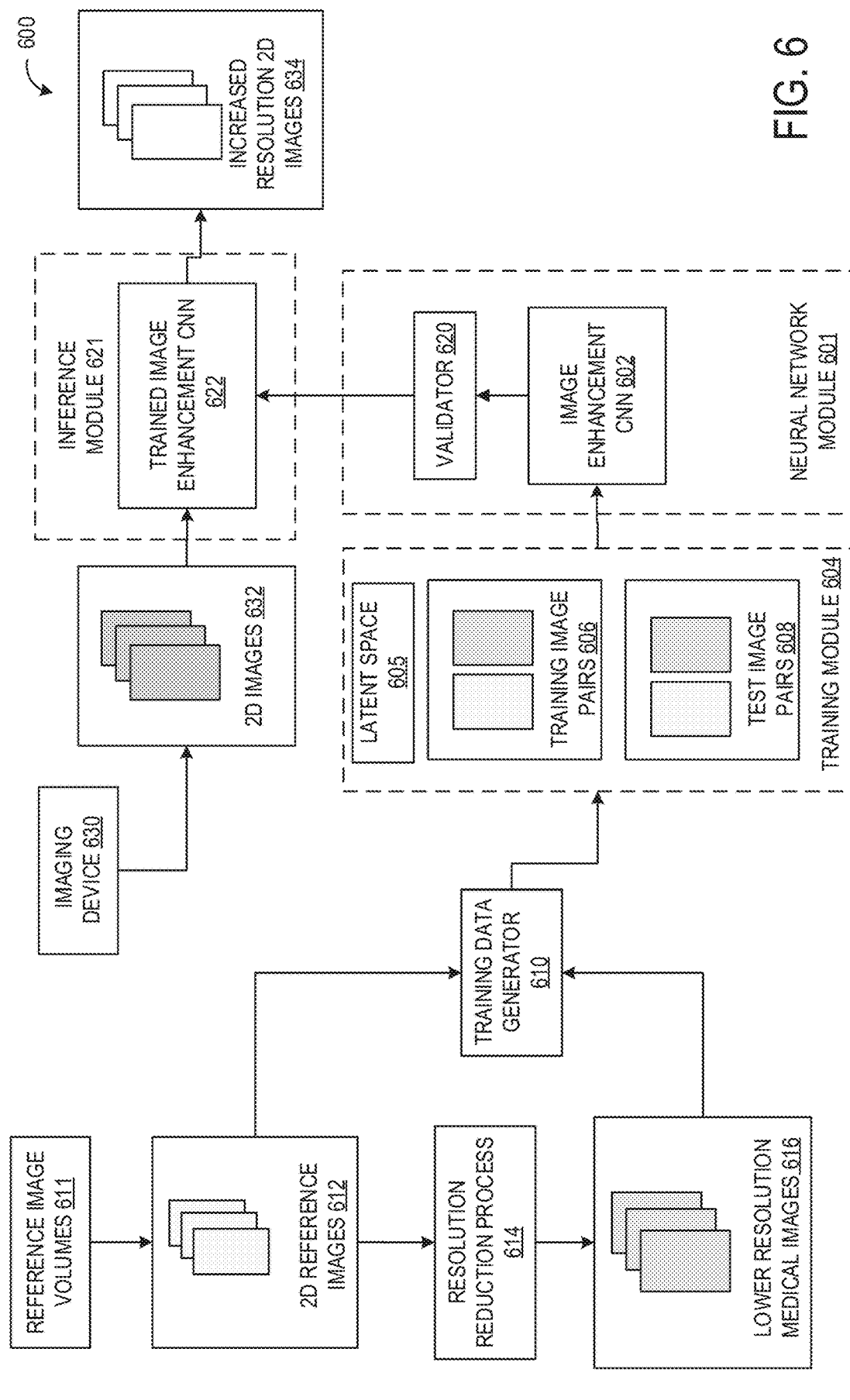
FIG. 6 shows a block diagram of an exemplary embodiment of a neural network training system for training a neural network to increase a resolution of a portion of a 2-D CT image, in accordance with one or more embodiments of the present disclosure.

Referring now to FIG. 6, an example of a neural network training system 600 is shown, which may be used to train a neural network such as an image enhancement CNN 602. Image enhancement CNN 602 may be trained to enhance a quality of a 2-D medical image by generating a higher-resolution version of the 2-D medical image, in accordance with one or more operations described in greater detail below in reference to method 700 of FIG. 7. Neural network training system 600 may be implemented by an image processing system, such as image processing system 302 of FIG. 3.

Image enhancement CNN 602 may be stored within a neural network module 601 of the image processing system. Neural network module 601 may be a non-limiting example of neural network module 308 of image processing system 302 of FIG. 3. Neural network training system 600 also includes a training module 604, which includes a training dataset comprising a plurality of training pairs of data, such as image pairs divided into training image pairs 606 and test image pairs 608. Training module 604 may be a non-limiting example of training module 310 of image processing system 302.

A number of training image pairs 606 and test image pairs 608 may be selected to ensure that sufficient training data is available to prevent overfitting, whereby the image enhancement CNN 602 learns to map features specific to samples of the training set that are not present in the test set.

Each image pair of the training image pairs 606 and the test image pairs 608 comprises a 2-D input image and a 2-D target image. The target image and the input image may be images of a same anatomy of a subject but with different resolutions, where the target image has a higher resolution than the input image. In various embodiments, the input image may be generated from the target image. For example, a set of reference medical images 612 may be used to generate the input images and the target images. The set of reference medical images 612 may be generated from a plurality of reference image volumes 611 of various types, such as CT images, MR images, PET images, SPECT images, and/or image volumes of a different type. In various embodiments, the set of reference image volumes 611 and/or reference medical images 612 may be extracted from a PACS of the imaging system (e.g., PACS 224 of FIG. 2). Various criteria may be used to select the reference images. In particular, the reference images may be selected from various modalities (e.g., CT, MRI, PET, etc.) and may include various anatomies of a subject. The reference images may be images having a resolution above a threshold (e.g., high) resolution.

In various embodiments, the input image may be generated from the target image via a resolution reduction process 614 of neural network training system 600. Resolution reduction process 614 may decrease a resolution of the reference medical images 612 to generate a set of lower-resolution medical images 616. Resolution reduction process 614 may incorporate one or more of various techniques and/or technologies to reduce the resolution of the reference medical images 612, as described in greater detail in reference to FIG. 7.

Neural network training system 600 may include a training data generator 610, which may be used to generate the training image pairs 606 and the test image pairs 608 of the training module 604. Images from the set of reference medical images 612 may be paired with corresponding images from the lower-resolution medical images 616 by training data generator 610 to form image pairs. Once each image pair is generated, the image pair may be assigned to either the training image pairs 606 or the test image pairs 608.

In various embodiments, image enhancement CNN 602 may take as an additional input a latent space representation 605 of a reference image volume 611 corresponding to the input image and the target image of a respective training image pair 606. As described above, a latent space representation 605 may be generated from reference image volume 611 that includes features extracted from the reference image volume 611. Generation of the latent space representation 605 is described in greater detail below in reference to FIG. 7.

In an embodiment, the image pair may be assigned to either the training image pairs 606 or the test image pairs 608 randomly in a pre-established proportion. For example, the image pair may be assigned to either the training image pairs 606 or the test image pairs 608 randomly such that 90% of the image pairs generated are assigned to the training image pairs 606, and 10% of the image pairs generated are assigned to the test image pairs 608. Alternatively, the image pair may be assigned to either the training image pairs 606 or the test image pairs 608 randomly such that 85% of the image pairs generated are assigned to the training image pairs 606, and 15% of the image pairs generated are assigned to the test image pairs 608. It should be appreciated that the examples provided herein are for illustrative purposes, and image pairs may be assigned to the training image pairs 606 dataset or the test image pairs 608 dataset via a different procedure and/or in a different proportion without departing from the scope of this disclosure.

Neural network training system 600 may include a validator 620 that validates the performance of the image enhancement CNN 602 against a portion of the test image pairs 608 (e.g., a validation set). The validator 620 may take as input a partially trained image enhancement CNN 602 and the validation set of test image pairs 608, and may output an assessment of the performance of the partially trained image enhancement CNN 602 on the validation set of test image pairs 608.

Once the image enhancement CNN 602 has been validated, a trained image enhancement CNN 622 (e.g., the validated image enhancement CNN 602) may be used to generate a set of higher resolution 2-D medical images 634 from a set of acquired 2-D medical images 632. For example, the acquired medical images 632 may be acquired by an imaging device 630, which may be a non-limiting example of CT scanner 336 of FIG. 3. Trained image enhancement CNN 622 may be stored within an inference module 621 of the image processing system (e.g., inference module 312 of FIG. 3). Trained image enhancement CNN 622 may also be deployed at a client device running a medical review software application, such as client device 502 of FIG. 5.

Referring now to FIG. 7, a flowchart is shown of a method 700 for training an image enhancement CNN (e.g., a DL model such as DL model 514 of FIG. 5). The image enhancement CNN may be a non-limiting example of the image enhancement CNN 602 of the image enhancement network training system 600 of FIG. 6, according to an exemplary embodiment. In an embodiment, operations of method 700 may be stored in non-transitory memory of the image processing system (e.g., in a training module such as the training module 310 of the image processing system 302 of FIG. 3) and executed by a processor of the image processing system (e.g., the processor 304 of image processing system 302 of FIG. 3). The image enhancement CNN may be trained on training data comprising one or more sets of image pairs. Each image pair of the one or more sets of image pairs may comprise medical images with different resolutions, as described below. In some embodiments, the one or more sets of image pairs may be stored in a medical image dataset of an image processing system, such as the medical image data 314 of image processing system 302.

Method 700 begins at 702, where method 700 includes acquiring a set of reference image volumes that may be used to generate a training data set of 2-D medical images. The reference image volumes may include various types of images, such as CT images, PET images, MR images, SPECT images, and/or other types of images. The reference image volumes may cover a variety of different patient types and sizes, including men, women, and children, who present various different types of pathologies in various different organs and/or areas of the body. The pathologies may be in various states of progression. For example, the reference image fibers may include a first image volume reconstructed from a patient at a first time including precancerous tissues; a second image volume reconstructed from the patient at a second time showing tissues at an early stage of malignancy; a third image volume reconstructed from the patient at a third time showing tissues at a later stage of malignancy; and so on. An objective of generating the reference image volumes may be to assemble collections of both healthy and diseased tissues across a wide range of patients and anatomical areas.

At 704, method 700 includes generating 2-D reference images from the reference image volumes, to be used for training the image enhancement CNN. The 2-D reference images may be selected from various slices of the reference image volumes, including images of sagittal, coronal, and axial views. A plurality of 2-D reference images may be selected from a single reference image volume. The 2-D reference images may include both diseased tissues and healthy tissues.

At 706, method 700 includes generating a lower resolution image for each of the generated 2-D reference images. Various techniques, methods, and or/technologies may be used to generate the lower resolution images. For example, in one embodiment, one or more diffusion models may be used to reduce a resolution of a 2-D reference image. In other embodiments, a vision transformer may be used to reduce the resolution, or a different technique, technology, or process. For example, a CNN backbone may be used to extract deep features, and a transformer backbone may be used to model a long-term dependence between similar local regions in an image.

In other words, for each 2-D reference image, a resolution reduction process (e.g., resolution reduction process 614 of neural network training system 600 of FIG. 6) may be applied to generate a corresponding lower-resolution medical image (e.g. lower-resolution medical image 616). In some embodiments, resolution reduction processes may be applied to different 2-D reference images to generate corresponding lower-resolution medical images. For example, a first resolution reduction process may be applied to a first 2-D reference image to generate a first corresponding lower-resolution medical image; a second resolution reduction process may be applied to a second 2-D reference image to generate a second corresponding lower-resolution medical image, where the second resolution reduction process is different from the first resolution reduction process; and so on. Alternatively, a first plurality of resolution reduction processes may be applied to the first 2-D reference image to generate the first corresponding lower-resolution medical image; a second plurality of resolution reduction processes may be applied to the second 2-D reference image to generate the second corresponding lower-resolution medical image, where the second plurality of resolution reduction processes is different from the first plurality of resolution reduction processes; and so on. In this way, various processes may be used and/or combined to generate a broad range of lower-resolution medical images, while maintaining a 1:1 correspondence with the 2-D reference images.

Further, in some examples, an amount of random noise maybe added to some or all of the lower-resolution medical images. For example, the random noise maybe added using a random noise generator. The noise may include haze, blurring, or other artifacts generated at different scales. The amount of the random noise may vary across different lower-resolution medical images. For example, one lower-resolution medical image may have a first amount of noise, and other lower-resolution medical images may have different amounts of noise, where the different amounts of noise may be greater amounts of noise, or lesser amounts of noise.

At 708, method 700 includes generating a dataset of training pairs of 2-D medical images, where each training pair includes a 2-D reference image with higher resolution as a target image, and a corresponding lower-resolution medical image derived from the 2-D reference image via the resolution reduction process as an input image. In an embodiment, the input image and the target image may be paired by a training data generator, such as training data generator 610 of neural network training system 600. Once the image pairs have been created, the image pairs may be divided into training image pairs and test image pairs, as described above in reference to FIG. 6.

At 710, method 700 includes associating with each training pair of the dataset of training pairs a latent space representation of a reference image volume corresponding to the target image and input image of the training pair. The latent space representation may include features extracted from the relevant reference image volume. The image enhancement CNN may take the latent space representation as an additional input. In some embodiments, the latent space representation corresponding to the 2-D reference image may be based on a latent space of the image volume stored in a memory of an image processing system (e.g., training module 310 of image processing system 302). The latent space may be generated as described above in reference to FIG. 11. For example, each reference image volume may be inputted into an autoencoder CNN to generate the latent space for the reference image volume. Each latent space of each reference image volume may be stored in the memory.

In one embodiment, the latent space representation for a relevant image pair includes a first 3-D portion of the latent space, where the first 3-D portion includes the target image of the image pair. In other embodiments, the latent space representation may be generated by encoding a second 3-D portion of the reference image volume, where the second 3-D portion includes to the target image. For example, the 3-D portion of the reference image volume may be extracted and inputted into the autoencoder CNN to generate a latent space of the 3-D portion of the reference image, and a series of 2-D images extracted from the latent space and sharing the same point of view as the target image may be used as the latent space representation.

Turning briefly to FIG. 12, an encoder diagram 1200 shows how a latent space representation 1210 may be generated from an image volume 1202, in accordance with one embodiment. A 3-D portion 1204 of image volume 1202 is first extracted from image volume 1202. In one embodiment, boundaries of 1204 may be randomly selected during training. 3-D portion 1204 is then inputted into an encoder, which may be an encoder portion of a CNN such as the autoencoder CNN described above. 3-D portion 1204 may be inputted into a plurality of convolutional layers of the encoder, including convolutional layers 1206 and 1208. Latent space representation 1210 may be an output of convolutional layer 1208. In this way, features in the 3-D portion 1204 may be represented in a compressed form in latent space representation 1210. After training, during an inference stage (as described below in reference to FIG. 8), the trained encoder may be used to generate latent space of a new image Returning to method 700, the latent space representation corresponding to both the 2-D reference (target) image and the lower-resolution (input) image may be inputted into the image enhancement CNN during training, as described below. By including the corresponding latent space representation with each training image pair during the training, a performance of the image enhancement CNN at generating the higher-resolution image may be increased.

At 712, method 700 includes training the image enhancement CNN on the training pairs including the latent space representation. More specifically, training the image enhancement CNN on the training pairs includes training the image enhancement CNN to learn to map the lower resolution input 2-D medical images to the higher resolution target 2-D medical images. In some embodiments, the image enhancement CNN may include one or more convolutional layers, which in turn comprise one or more convolutional filters. The convolutional filters may comprise a plurality of weights, wherein the values of the weights are learned during a training procedure. The convolutional filters may correspond to one or more visual features/patterns, thereby enabling the image enhancement CNN to identify and extract features from the medical images. In other embodiments, the image enhancement CNN may not be a convolutional neural network, and may be a different type of neural network.

Training the image enhancement CNN on the image pairs may include iteratively inputting an input image of each training image pair into an input layer of the image enhancement CNN. In some embodiments, each pixel intensity value of the input image may input into a distinct neuron of the input layer of the image enhancement CNN. The image enhancement CNN may map the input image to a corresponding target image by propagating the input image from the input layer, through one or more hidden layers, until reaching an output layer of the image enhancement CNN. In some embodiments, the output of the image enhancement CNN comprises a 2-D matrix of values, wherein each value corresponds to a distinct intensity of a pixel of the input image, and wherein a distinct intensity of each pixel of the output image generates an output image that is a version of the input image with a higher resolution than the input image.

The image enhancement CNN may have an encoder-decoder architecture including a first encoder portion and a second decoder portion. The latent space representation associated with the training pair may be inputted into the image enhancement CNN, either at the input layer, or at an initial feature map of the second decoder portion. The inputting of the latent space representation is described in reference to the exemplary image enhancement CNN of FIG. 9 and in FIG. 13 below.

The image enhancement CNN may be configured to iteratively adjust one or more of the plurality of weights of the image enhancement CNN in order to minimize a loss function, based on an assessment of differences between the input image and the target image comprised by each image pair of the training image pairs. In one embodiment, the loss function is a Mean Absolute Error (MAE) loss function, where differences between the input image and the target image are compared on a pixel-by-pixel basis and summed. In another embodiment, the loss function may be a Structural Similarity Index (SSIM) loss function. In other embodiments, the loss function may be a minimax loss function, or a Wasserstein loss function, or a different loss function. It should be appreciated that the examples provided herein are for illustrative purposes, and other types of loss functions may be used without departing from the scope of this disclosure.

The weights and biases of the image enhancement CNN may be adjusted based on a difference between the output image and the target (e.g., ground truth) image of the relevant image pair. The difference (or loss), as determined by the loss function, may be back propagated through the image enhancement CNN to update the weights (and biases) of the convolutional layers. In some embodiments, back propagation of the loss may occur according to a gradient descent algorithm, wherein a gradient of the loss function (a first derivative, or approximation of the first derivative) is determined for each weight and bias of the image enhancement CNN. Each weight (and bias) of the image enhancement CNN is then updated by adding the negative of the product of the gradient determined (or approximated) for the weight (or bias) with a predetermined step size. Updating of the weights and biases may be repeated until the weights and biases of the image enhancement CNN converge, or the rate of change of the weights and/or biases of the deep neural network for each iteration of weight adjustment are under a threshold.

In order to avoid overfitting, training of the image enhancement CNN may be periodically interrupted to validate a performance of the image enhancement CNN on a portion of the training pairs (e.g., a validation set) that are not used for training the image enhancement CNN. In an embodiment, training of the image enhancement CNN may end when a performance of the image enhancement CNN on the test image pairs converges (e.g., when an error rate on the test set converges on or to within a threshold of a minimum value). Convergence may be determined by evaluating the trained image enhancement CNN on the test image pairs. In this way, the image enhancement CNN may be trained to generate a copy of an input image, where the copy of the input image has a higher resolution than the input image.

In some embodiments, an assessment of the performance of the image enhancement CNN may include a combination of a minimum error rate and a quality assessment, or a different function of the minimum error rates achieved on each image pair of the test image pairs and/or one or more quality assessments, or another factor for assessing the performance of the image enhancement CNN. It should be appreciated that the examples provided herein are for illustrative purposes, and other loss functions, error rates, quality assessments, or performance assessments may be included without departing from the scope of this disclosure.

Referring now to FIG. 8, a flowchart is shown of a method 800 for using an image enhancement CNN, such as image enhancement CNN 602 of FIG. 6 and/or image enhancement CNN 900 of FIG. 9, to generate and display a higher-resolution version of a 2-D medical image in a magnification window of a medical image review application. Method 800 may be executed by a client device, such as client device 502 of FIG. 5, of an imaging system, such as the imaging systems 100 and 200 of FIGS. 1 and 2, respectively. Some operations of method 800 may be stored in a memory of the client device (e.g., memory 524) and executed by a processor of the client device (e.g., processor 522). In various embodiments, the image enhancement CNN may be trained as described above in reference to method 700 of FIG. 7.

Method 800 begins at 802, where method 800 includes receiving a bounding box (e.g., bounding box 404 of FIGS. 4A and 4B) from a medical image review application running on a computer of a user, such as a radiologist. The user may use the medical image review application to review various 2-D medical images extracted from an image volume acquired from a subject using the imaging system. Based on the review, the user may diagnose a condition of the subject. The bounding box includes a selected portion of a 2-D medical image displayed in the medical image review application.

The bounding box may be drawn by the user, or the bounding box may be generated based on a position of a cursor in the medical image review application in response to one or more selected controls of the medical image review application. For example, the bounding box may be generated by the user selecting a magnifying glass icon of the medical image review application, and then selecting a center point of the selected portion with an input device such as a mouse. When the center point of the selected portion is selected, the medical image review application may generate the bounding box around the selected portion.

At 804, method 800 includes cropping the 2-D medical image based on the bounding box. Thus, the selected portion of the 2-D medical image may be included in a cropped 2-D medical image, and other portions of the 2-D medical image outside the selected portion may be discarded. The (original) 2-D medical image may remain on the screen within the medical image review application, and the cropped 2-D medical image may be used to generate a magnified version of the selected portion.

At 806, method 800 includes retrieving a latent space representation (e.g., latent space representation 532) of the image volume corresponding to the 2-D medical image. In a first embodiment, the latent space representation may be retrieved from a memory of the client device (e.g., memory 524). Specifically, the latent space representation may be generated from a latent space of the image volume transmitted in advance from a computing device of the imaging system (e.g., computing device 504 of FIG. 5). For example, the latent space of the image volume may be transmitted to the client device when the image volume is selected in the medical image review application, or the latent space of the image volume may be transmitted to the client device along with the 2-D medical image. The latent space of the image volume may be stored in the memory of the client device. The latent space representation may include 3-D portions of different channels of the latent space of the image volume, where the 3-D portions include the 2-D medical image, as described below in reference to FIG. 13.

In a second embodiment, the latent space representation may be requested from a server running at the computing device (e.g., server 505) when the 2-D medical image is requested. The server may extract the image volume from a memory of the computing device (e.g., memory 534). The server may extract a 3-D portion of the image volume including the 2-D medical image, and encode the 2-D medical image using an encoder to generate the latent space representation, as described in reference to FIG. 12. The server may then send the latent space representation back to the client device.

At 808, method 800 includes inputting the cropped 2-D medical image and the latent space representation into the trained image enhancement CNN. The trained image enhancement CNN may include an encoder portion and a decoder portion. In various embodiments, inputting the acquired 2-D medical image into the trained image enhancement CNN comprises inputting image data of each pixel of the acquired 2-D medical image into a corresponding node of an input layer of the encoder portion of the image enhancement CNN. A first latent space representation generated in accordance with the first embodiment described above may be inputted into an input layer of a second encoder portion of the image enhancement, where the image enhancement CNN has an architecture similar to that described in reference to FIG. 13. Alternatively, a second latent space representation generated in accordance with the second embodiment described above may be inputted into the decoder portion, as described in reference to FIG. 9.

Values of the image data may be multiplied by weights at the corresponding nodes, and propagated through various hidden layers (e.g., convolutional layers) to an output layer of the image enhancement CNN. The output layer may include nodes corresponding to each pixel of an output 2-D medical image, where the output 2-D medical image is based on image data outputted by each node. The output image may have a higher resolution than the input image.

At 810, method 800 includes displaying the higher-resolution image outputted by the trained image enhancement CNN in the magnification window of the medical image review application. The higher-resolution image may be displayed in real time while the user is reviewing the 2-D medical images. For example, in response to the user selecting the selected portion, the higher-resolution image may be displayed on the screen without any intentional delay. The user may then select a different portion of the 2-D medical image, and the different portion may be displayed on the screen within the magnification window without any intentional delay.

In some embodiments, the user may also choose to display a classical bilinear/cubic/spline interpolation in the magnification window, to ensure that artifacts are not generated in the higher-resolution image.

Referring to FIG. 9, an exemplary image enhancement CNN 900 is shown, where exemplary image enhancement CNN 900 may be a non-limiting example of image enhancement CNN 602 of FIG. 6. Image enhancement CNN 900 may take as input a 2-D medical image 902*a*, and generate as output a corresponding higher-resolution 2-D medical image 956*b*. Image enhancement CNN 900 is divided into an encoding portion (descending portion, elements 902*b*-930) and a decoding portion (ascending portion, feature maps 932-956*a*). Image enhancement CNN 900 includes a series of mappings, from a pixel representation of an input image 902*b* which may be received by an input layer 903, through a plurality of feature maps, and finally to a pixel representation of an output image 956*b*, which may be produced by an output layer 956*a*.

The various elements comprising image enhancement CNN 900 are labeled in legend 958. As indicated by legend 958, image enhancement CNN 900 includes a plurality of feature maps (and/or copied feature maps), wherein each feature map may receive input from a previous feature map, and may transform/map the received input to output to produce a next feature map. Each feature map may comprise a plurality of neurons, where in some embodiments, each neuron may receive input from a subset of neurons of a previous layer/feature map, and may compute a single output based on the received inputs, wherein the output may be propagated to a subset of the neurons in a next layer/feature map. A feature map may be described using spatial dimensions, such as length and width (which may correspond to features of each pixel of the input image) wherein the dimensions refer to the number of neurons comprising the feature map (e.g., the number of neurons along a length and the number of neurons along a width of a specified feature map).

In some embodiments, the neurons of the feature maps may compute an output by performing a dot product of received inputs using a set of learned weights (each set of learned weights may herein be referred to as a filter), wherein each received input has a unique corresponding learned weight, wherein the learned weight was learned during training of the CNN.

The transformations/mappings performed by each feature map are indicated by arrows, wherein each type of arrow corresponds to a distinct transformation, as indicated by legend 958. Rightward pointing solid black arrows indicate convolutions, wherein output from a grid of feature channels of an immediately preceding feature map are mapped to a single feature channel of a current feature map. Each convolution may be followed by an activation function, wherein, in one embodiment, the activation function comprises a rectified linear unit (ReLU).

Downward pointing hollow arrows indicate pooling, wherein the max value from a 2×2 grid of feature channels is propagated from an immediately preceding feature map to a single feature channel of a current feature map, thereby resulting in an 8-fold reduction in spatial resolution of the immediately preceding feature map. In some examples, this pooling occurs for each feature independently. The pooling may be max pooling or average pooling.

In the decoder portion of image enhancement CNN 900, upward pointing hollow arrows may indicate upscaling operations, which comprise mapping output from a single feature channel of an immediately preceding feature map to a 2×2 grid of feature channels in a current feature map, thereby increasing the spatial resolution of the immediately preceding feature map 8-fold. While not depicted in FIG. 9, additional upscaling operations or layers may also be included in CNN 900.

Rightward pointing dash-tailed arrows indicate copying and cropping of a feature map for concatenation with another, later occurring, feature map. Cropping enables the dimensions of the copied feature map to match the dimensions of the feature map with which the copied feature map is to be concatenated. It will be appreciated that when the size of the first feature map being copied and the size of the second feature map to be concatenated with the first feature map are equal, no cropping may be performed.

Rightward pointing arrows with hollow elongated triangular heads indicate a 1×1 convolution, in which each feature channel in an immediately preceding feature map is mapped to a single feature channel of a current feature map, or in other words, wherein a 1-to-1 mapping of feature channels between an immediately preceding feature map and a current feature map occurs. Additionally, a batch normalization operation may be performed, wherein a distribution of activations of an input feature map are normalized, as indicated by a rightward pointing arrow with an arcuate hollow head; and/or a dropout operation may be performed, wherein random or pseudo-random dropout of input neurons (as well as their inputs and outputs) may occur during training, as indicated by a rightward pointing arrow with a short hollow triangular head.

The feature maps of image enhancement CNN 900 are depicted as solid filled rectangles with a height (top to bottom length as shown in FIG. 9, corresponding to a y spatial dimension in an x-y plane), width (not shown in FIG. 9, assumed equal in magnitude to height, corresponding to an x spatial dimension in an x-y plane), and depth (a left-right length as shown in FIG. 9, corresponding to the number of features within each feature channel). Likewise, image enhancement CNN 900 includes hollow (unfilled) rectangles, corresponding to copied and cropped feature maps, wherein copied feature maps comprise height (top to bottom length as shown in FIG. 9, corresponding to a y spatial dimension in an x-y plane), width (not shown in FIG. 9, assumed equal in magnitude to height, corresponding to an x spatial dimension in an x-y plane), and depth (a length from a left side to a right side as shown in FIG. 9, corresponding to the number of features within each feature channel).

In this way, image enhancement CNN 900 may enable mapping of a first image having a first resolution to a second image with a higher resolution. Image enhancement CNN 900 illustrates the feature map transformations which occur as the first image is propagated through the neuron layers of the convolutional neural network, to produce the second image. The weights (and biases) of the convolutional layers in image enhancement CNN 900 are learned during training, as described in reference to FIG. 7.

As described in reference to FIG. 7, a latent space representation of an image volume of 2-D medical image 902*a* may additionally be inputted into image enhancement CNN 900, at a beginning of the decoder portion of image enhancement CNN 900. For example, latent space representation 960 may be inputted into a feature map 932 along with an output of feature map 930. Latent space representation 960 may be a latent space of a portion of the image volume, such as latent space representation 1210 of FIG. 12. In one embodiment, latent space representation 1210 is concatenated to the output of feature map 930, and the resulting concatenation is inputted into feature map 932.

In other embodiments, latent space representation 960 may be inputted into image enhancement CNN 900 at input layer 903. In such embodiments, latent space representation 960 may be generated from a latent space of the image volume. For example, the latent space of the image volume may be generated as described in relation to FIG. 11 and stored in the memory of the image processing system along with the image volume. Latent space representation 960 may include a 3-D portion of the latent space that includes a 2-D medical image 902*a*. Further, in such embodiments, the encoder-decoder architecture of FIG. 9 may be adjusted to include an additional encoder portion, where latent space representation 960 may be inputted into an input layer of the additional encoder portion, as shown in FIG. 13.

It will be appreciated that the current disclosure encompasses neural network architectures comprising one or more regularization layers, including batch normalization layers, dropout layers, and other regularization layers known in the art of machine learning which may be used during training to mitigate overfitting and increase training efficiency while reducing training duration. Regularization layers are used during CNN training and deactivated or removed during post training implementation of the CNN. These layers may be interspersed between the layers/feature maps shown in FIG. 9, or may replace one or more of the shown layers/feature maps.

It should be understood that the architecture and configuration of image enhancement CNN 900 shown in FIG. 9 is for illustration, not for limitation, and other appropriate neural networks may be used herein for increasing a resolution of a medical image. The other appropriate neural networks may include a greater or fewer number of layers, feature maps, etc.

Referring now to FIG. 13, a simplified alternative encoder-decoder architecture 1300 of an image enhancement CNN such as image enhancement CNN 900 is shown. Alternative encoder-decoder architecture 1300 includes a first encoder portion 1306, a second encoder portion 1308, and a decoder portion 1312. First encoder portion 1306 and second encoder portion 1308 may each be structurally the same as or similar to the encoder portion of FIG. 9, and decoder portion 1312 may be structurally the same as or similar to the decoder portion of FIG. 9.

An input image 1302 of a training pair may be inputted into an input layer of first encoder portion 1306. A latent space representation 1304 corresponding to an image volume from which input image 1302 was extracted may be inputted into an input layer of second encoder portion 1308. Latent space representation 1304 may include a plurality of extracted 2-D images of a latent space 1301 of the image volume (e.g., compressed representation 1110 of FIG. 11), where one 2-D image may be extracted from each channel of latent space 1301. The extracted 2-D images may share a same point of view (e.g., camera position/angle) as input image 1302.

A first output of first encoder portion 1306 and a second output of second encoder portion 1308 may be concatenated, and inputted into decoder portion 1312. Decoder portion 1312 may output an image 1314, which may be a higher-resolution version of input image 1302. A loss may then be calculated between image 1314 and a target image of the training pair, and the loss may be back propagated through the image enhancement CNN to adjust the weights and biases of convolutional layers in decoder portion 1312, first encoder portion 1306, and second encoder portion 1308. In this way, latent space representation 1304 may be encoded by a different encoder portion than input image 1302, and the outputs of both encoder portions may be combined at decoder portion 1312. By including the 3-D feature information stored in latent space representation 1304 in the generation of output image 1314 from input image 1302, a quality of image 1314 may be increased.

Thus, the user of a medical review software application may view a desired anatomical structure of a 2-D medical image displayed in the application in a greater amount of detail than the amount of detail provided in the 2-D medical image, by generating a magnified version with super-resolution. The super-resolution image may be used to diagnose a condition of the subject. By showing the selected portion of the 2-D medical image in higher resolution within the magnification window, anatomical features of the subject may be more clearly visible to the user, whereby the condition may be more accurately diagnosed, leading to better treatment outcomes for patients. Additionally, the ability to zoom in and enhance medical images and the higher resolution provided by the magnification window may lead to a better understanding of complex medical conditions and more informed treatment decisions. Because of the case of use of the magnification window, combined with the increased accuracy of medical diagnoses, the diagnoses may be made more quickly, resulting in a faster treatment of medical conditions. Further, an efficiency of functioning of the imaging system overall may be increased, reducing a computational load of the imaging system and freeing up computational and memory resources to be used for other tasks.

The technical effect of generating and displaying a portion of a 2-D medical image in a higher resolution within a magnification window is that anatomical structures included in the portion may be seen in greater detail, resulting in more accurate and timely diagnoses.

The disclosure also provides support for a method for a medical imaging system, comprising: while displaying a first two-dimensional (2-D) medical image having a first resolution in a medical review software application running on a client device of the medical imaging system, the first 2-D medical image generated from an image volume acquired via the medical imaging system, displaying a selected portion of the first 2-D medical image in a second resolution, the second resolution higher than the first resolution. In a first example of the method, the selected portion of the medical image includes an area defined by a bounding box generated on the first 2-D medical image by a user of the client device. In a second example of the method, optionally including the first example, displaying the selected portion of the medical image in the second resolution further comprises displaying a second 2-D medical image having the second resolution in a magnification window superimposed on the 2-D medical image, the second 2-D medical image generated by a neural network trained to generate a higher-resolution version of 2-D medical images. In a third example of the method, optionally including one or both of the first and second examples, displaying the selected portion of the medical image in the second resolution further comprises: cropping the first 2-D medical image based on the bounding box, inputting the cropped first 2-D medical image into the trained neural network to generate the second 2-D medical image. In a fourth example of the method, optionally including one or more or each of the first through third examples, displaying the selected portion of the medical image in the second resolution further comprises: inputting the first 2-D medical image into the trained neural network to generate the second 2-D medical image, cropping the second 2-D medical image based on the bounding box, displaying the cropped second 2-D medical image in the magnification window. In a fifth example of the method, optionally including one or more or each of the first through fourth examples, the method further comprises: requesting and receiving the first 2-D medical image from a server of a computing device of the medical imaging system at the client device, generating the second 2-D medical image at the client device based on the first 2-D medical image using the trained neural network. In a sixth example of the method, optionally including one or more or each of the first through fifth examples, the trained neural network is a convolutional neural network (CNN) with an encoder-decoder architecture including an encoder portion and a decoder portion. In a seventh example of the method, optionally including one or more or each of the first through sixth examples, the method further comprises: inputting a latent space representation of the image volume into the trained neural network as an additional input to generate the second 2-D medical image. In an eighth example of the method, optionally including one or more or each of the first through seventh examples, the latent space representation includes a three-dimensional (3-D) portion of a latent space of the image volume corresponding to the first 2-D medical image, and the 3-D portion is inputted into the decoder portion of the trained neural network. In a ninth example of the method, optionally including one or more or each of the first through eighth examples, the latent space representation includes a plurality of 2-D images extracted from a latent space of the image volume, each 2-D image of the plurality of 2-D images corresponding to a different channel of the latent space, and the first 2-D medical image is inputted into a first encoder portion of the trained neural network, and the plurality of 2-D images are inputted into a second encoder portion of the trained neural network, the second encoder portion different from the first encoder portion. In a tenth example of the method, optionally including one or more or each of the first through ninth examples-D images extracted from the latent space of the image volume have a same point of view as the first 2-D medical image. In an eleventh example of the method, optionally including one or more or each of the first through tenth examples, a first output of the first encoder portion and a second output of the second encoder portion are concatenated and inputted into the decoder portion.

The disclosure also provides support for a medical imaging system, comprising: a computing device storing an image volume of a subject of the medical imaging system, and a client device running a medical review software application, the client device including a processor communicably coupled to a non-transitory memory of the client device including instructions that when executed, cause the processor to: request a two-dimensional (2-D) medical image of the image volume and a latent space representation of the image volume from the computing device, display the requested 2-D medical image on a screen of the client device, and in response to a user of the client device selecting a magnification tool of the medical review software application: receive a selected portion of the requested 2-D medical image selected by the user, input the selected portion and the latent space representation of the image volume into a trained convolutional neural network (CNN) stored on the client device, receive, as an output of the trained CNN, a higher-resolution 2-D medical image corresponding to the selected portion, and display the higher-resolution 2-D medical image in a magnification window of the medical review software application. In a first example of the system, the selected portion is inputted into an input layer of an encoder portion of the trained CNN, and the latent space representation is inputted into a first layer of a decoder portion of the trained CNN. In a second example of the system, optionally including the first example, the selected portion is inputted into an input layer of a first encoder portion of the trained CNN, the latent space representation is inputted into a second encoder portion of the trained CNN, and a first output of the first encoder portion and a second output of the second encoder portion are concatenated and inputted into the decoder portion of the trained CNN. In a third example of the system, optionally including one or both of the first and second examples, the selected portion is defined by a bounding box created by the user on the screen, and further instructions are stored in the non-transitory memory that when executed, cause the processor to: crop the requested 2-D medical image based on the bounding box, input the cropped 2-D medical image into the trained CNN to generate the higher-resolution 2-D medical image, and display the cropped 2-D medical image in the magnification window. In a fourth example of the system, optionally including one or more or each of the first through third examples, the selected portion is defined by a bounding box created by the user on the screen, and further instructions are stored in the non-transitory memory that when executed, cause the processor to: input the requested 2-D medical image into the trained CNN to generate the higher-resolution 2-D medical image, crop the higher-resolution 2-D medical image based on the bounding box, display the cropped higher-resolution 2-D medical image in the magnification window.

The disclosure also provides support for a method for a medical imaging system, comprising: generating a plurality of 2-D medical images from one or more reference image volumes stored in a memory of the medical imaging system, for each 2-D medical image of the plurality of 2-D medical images, generating a lower-resolution version of the 2-D medical image, creating a respective plurality of image pairs, each image pair including a 2-D medical image of the plurality of 2-D medical images as a target, ground truth image, and a corresponding lower-resolution version of the 2-D medical image as an input image, associating with each image pair a latent space representation of a reference image volume corresponding to the image pair, training a convolutional neural network (CNN) on the image pairs and the latent space representation to increase a resolution of a 2-D medical image using the image pairs, and deploying the trained CNN at a client device of the medical imaging system, the trained CNN configured to receive as input a 2-D medical image of an image volume acquired from a subject of the medical imaging system and a latent space representation of the image volume, and output a higher-resolution version of the 2-D medical image, the higher-resolution version displayed in a magnification window of a medical review software application running on the client device. In a first example of the method, the trained CNN is further configured to input the 2-D medical image into a first encoder portion of the CNN, and input the latent space representation of the image volume into a second encoder portion of the trained CNN. In a second example of the method, optionally including the first example, the trained CNN is further configured to input the latent space representation of the image volume into a decoder portion of the trained CNN.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A computer-implemented method for a medical imaging system, the computer-implemented method comprising:
   while displaying a first two-dimensional (2-D) medical image having a first resolution in a medical review software application running on a client device of the medical imaging system, the first 2-D medical image generated from an image volume acquired via the medical imaging system, displaying a selected portion of the first 2-D medical image in a second resolution, the second resolution higher than the first resolution, the selected portion selected by a user of the client device,
   wherein the selected portion of the first 2-D medical image includes an area defined by a bounding box generated on the first 2-D medical image by the user via an input device of the client device,
   wherein displaying the selected portion of the first 2-D medical image in the second resolution further comprises displaying a second 2-D medical image having the second resolution in a magnification window superimposed on the 2-D medical image, the second 2-D medical image generated by a neural network trained to generate a higher-resolution version of 2-D medical images,
   wherein the trained neural network is a convolutional neural network (CNN) with an encoder-decoder architecture including an encoder portion and a decoder portion,
   the computer-implemented method further comprising inputting a latent space representation of the image volume into the trained neural network as an additional input to generate the second 2-D medical image.

2. The computer-implemented method of claim 1, wherein displaying the selected portion of the first 2-D medical image in the second resolution further comprises:
   cropping the first 2-D medical image based on the bounding box; and
   inputting the cropped first 2-D medical image into the trained neural network to generate the second 2-D medical image.

3. The computer-implemented method of claim 1, wherein displaying the selected portion of the first 2-D medical image in the second resolution further comprises:
   inputting the first 2-D medical image into the trained neural network to generate the second 2-D medical image;
   cropping the second 2-D medical image based on the bounding box; and
   displaying the cropped second 2-D medical image in the magnification window.

4. The computer-implemented method of claim 1, further comprising:
   requesting and receiving the first 2-D medical image from a server of a computing device of the medical imaging system at the client device; and
   generating the second 2-D medical image at the client device based on the first 2-D medical image using the trained neural network.

5. The computer-implemented method of claim 1, wherein the latent space representation includes a three-dimensional (3-D) portion of a latent space of the image volume corresponding to the first 2-D medical image, and the 3-D portion is inputted into the decoder portion of the trained neural network.

6. The computer-implemented method of claim 1, wherein the latent space representation includes a plurality of 2-D images extracted from a latent space of the image volume, each 2-D image of the plurality of 2-D images corresponding to a different channel of the latent space, and the first 2-D medical image is inputted into a first encoder portion of the trained neural network, and the plurality of 2-D images are inputted into a second encoder portion of the trained neural network, the second encoder portion different from the first encoder portion.

7. The computer-implemented method of claim 6, wherein the 2-D images extracted from the latent space of the image volume have a same point of view as the first 2-D medical image.

8. The computer-implemented method of claim 6, wherein a first output of the first encoder portion and a second output of the second encoder portion are concatenated and inputted into the decoder portion.

9. A medical imaging system, comprising:
   a computing device storing an image volume of a subject of the medical imaging system; and
   a client device running a medical review software application, the client device including a processor communicably coupled to a non-transitory memory of the client device including instructions that when executed, cause the processor to:

request a two-dimensional (2-D) medical image of the image volume and a latent space representation of the image volume from the computing device;

display the requested 2-D medical image on a screen of the client device; and in response to a user of the client device selecting a magnification tool of the medical review software application:

receive a selected portion of the requested 2-D medical image selected by the user;

input the selected portion and the latent space representation of the image volume into a trained convolutional neural network (CNN) stored on the client device;

receive, as an output of the trained CNN, a higher-resolution 2-D medical image corresponding to the selected portion; and display the higher-resolution 2-D medical image in a magnification window of the medical review software application.

10. The medical imaging system of claim 9, wherein the selected portion is inputted into an input layer of an encoder portion of the trained CNN, and the latent space representation is inputted into a first layer of a decoder portion of the trained CNN.

11. The medical imaging system of claim 9, wherein the selected portion is inputted into an input layer of a first encoder portion of the trained CNN, the latent space representation is inputted into a second encoder portion of the trained CNN, and a first output of the first encoder portion and a second output of the second encoder portion are concatenated and inputted into a decoder portion of the trained CNN.

12. The medical imaging system of claim 9, wherein the selected portion is defined by a bounding box created by the user on the screen, and further instructions are stored in the non-transitory memory that when executed, cause the processor to:

crop the requested 2-D medical image based on the bounding box;

input the cropped 2-D medical image into the trained CNN to generate the higher-resolution 2-D medical image; and display the cropped 2-D medical image in the magnification window.

13. The medical imaging system of claim 9, wherein the selected portion is defined by a bounding box created by the user on the screen, and further instructions are stored in the non-transitory memory that when executed, cause the processor to:

input the requested 2-D medical image into the trained CNN to generate the higher-resolution 2-D medical image;

crop the higher-resolution 2-D medical image based on the bounding box; and display the cropped higher-resolution 2-D medical image in the magnification window.

14. A method for a medical imaging system, comprising:

generating a plurality of 2-D medical images from one or more reference image volumes stored in a memory of the medical imaging system;

for each 2-D medical image of the plurality of 2-D medical images, generating a lower-resolution version of the 2-D medical image;

creating a respective plurality of image pairs, each image pair including a 2-D medical image of the plurality of 2-D medical images as a target, ground truth image, and a corresponding lower-resolution version of the 2-D medical image as an input image;

associating with each image pair a latent space representation of a reference image volume corresponding to the image pair;

training a convolutional neural network (CNN) on the image pairs and the latent space representation to increase a resolution of a 2-D medical image using the image pairs; and deploying the trained CNN at a client device of the medical imaging system, the trained CNN configured to receive as input a 2-D medical image of an image volume acquired from a subject of the medical imaging system and a latent space representation of the image volume, and output a higher-resolution version of the 2-D medical image, the higher-resolution version displayed in a magnification window of a medical review software application running on the client device.

15. The method of claim 14, wherein the trained CNN is further configured to input the 2-D medical image into a first encoder portion of the CNN, and input the latent space representation of the image volume into a second encoder portion of the trained CNN.

16. The method of claim 14, wherein the trained CNN is further configured to input the latent space representation of the image volume into a decoder portion of the trained CNN.

* * * * *